US010135783B2

United States Patent
Daniela et al.

(10) Patent No.: US 10,135,783 B2
(45) Date of Patent: *Nov. 20, 2018

(54) METHOD AND APPARATUS FOR MAINTAINING NETWORK COMMUNICATION DURING EMAIL DATA TRANSFER

(71) Applicant: Forcepoint LLC, Austin, TX (US)

(72) Inventors: Ramon Daniela, Zur Moshe (IL); Mark Ostrer, Petah-Tikva (IL); Michael Stoler, Rosh Haayin (IL)

(73) Assignee: Forcepoint LLC, Austin, TX (US)

(*) Notice: Subject to any disclaimer, the term of this patent is extended or adjusted under 35 U.S.C. 154(b) by 292 days.

This patent is subject to a terminal disclaimer.

(21) Appl. No.: 14/997,993

(22) Filed: Jan. 18, 2016

(65) Prior Publication Data

US 2016/0182439 A1 Jun. 23, 2016

Related U.S. Application Data

(63) Continuation of application No. 13/691,544, filed on Nov. 30, 2012, now Pat. No. 9,241,259.

(51) Int. Cl.
*H04M 1/66* (2006.01)
*H04L 12/58* (2006.01)
(Continued)

(52) U.S. Cl.
CPC .............. *H04L 51/34* (2013.01); *H04L 51/12* (2013.01); *H04W 12/02* (2013.01); *H04L 51/38* (2013.01); *H04L 63/0227* (2013.01); *H04W 12/12* (2013.01)

(58) Field of Classification Search
CPC ..................................................... H04W 12/02
(Continued)

(56) References Cited

U.S. PATENT DOCUMENTS 5,333,266 A 7/1994 Boaz et al.
5,619,648 A 4/1997 Canale et al.
(Continued)

FOREIGN PATENT DOCUMENTS

CN 1367595 A 9/2002
CN 1756147 A 4/2006
(Continued)

OTHER PUBLICATIONS

"U.S. Appl. No. 13/691,544, Final Office Action dated Mar. 13, 2015", 21 pgs.
(Continued)

*Primary Examiner* — Charles Shedrick
(74) *Attorney, Agent, or Firm* — Schwegman Lundberg & Woessner, P.A.

(57) ABSTRACT

Methods and apparatus provide for network communication to be maintained during transfer of email data between two devices. In one aspect a method includes receiving a request via a network connection with a mobile device for email data, determining a network timeout value of the request from the mobile device, producing the email data in response to receiving the request, in parallel with the production of the email data and while the processing of the email data is incomplete, determining an interval less than the network timeout value of the request, and sending a portion of a response to the request over the network connection to the mobile device at the interval, completing the response to the mobile device over the network connection in response to completion of the production of the email data.

20 Claims, 10 Drawing Sheets

(51) Int. Cl.
*H04W 12/02* (2009.01)
*H04W 12/12* (2009.01)
*H04L 29/06* (2006.01)

(58) Field of Classification Search
USPC .............................. 455/411, 412.1; 713/151
See application file for complete search history.

(56) References Cited

U.S. PATENT DOCUMENTS

| | | | |
|---|---|---|---|
| 5,724,576 A | 3/1998 | Letourneau | |
| 5,742,769 A | 4/1998 | Lee et al. | |
| 5,905,495 A | 5/1999 | Tanaka et al. | |
| 6,182,118 B1 | 1/2001 | Finney et al. | |
| 6,185,681 B1 | 2/2001 | Zizzi | |
| 6,252,884 B1 | 6/2001 | Hunter | |
| 6,301,658 B1 | 10/2001 | Koehler | |
| 6,357,010 B1 | 3/2002 | Viets et al. | |
| 6,460,141 B1 | 10/2002 | Olden | |
| 6,615,242 B1 | 9/2003 | Riemers | |
| 6,654,787 B1 | 11/2003 | Aronson et al. | |
| 6,732,180 B1 | 5/2004 | Hale et al. | |
| 6,988,209 B1 | 1/2006 | Balasubramaniam et al. | |
| 7,051,200 B1 | 5/2006 | Manferdelli | |
| 7,089,589 B2 | 8/2006 | Chefalas et al. | |
| 7,100,199 B2 | 8/2006 | Ginter et al. | |
| 7,136,867 B1 | 11/2006 | Chatterjee et al. | |
| 7,155,243 B2 | 12/2006 | Baldwin et al. | |
| 7,203,706 B2 | 4/2007 | Jain et al. | |
| 7,219,299 B2 | 5/2007 | Fields et al. | |
| 7,249,175 B1 | 7/2007 | Donaldson | |
| 7,346,512 B2 | 3/2008 | Li-chun Wang et al. | |
| 7,373,385 B2 | 5/2008 | Prakash | |
| 7,447,215 B2 | 11/2008 | Lynch et al. | |
| 7,464,407 B2 | 12/2008 | Nakae et al. | |
| 7,487,217 B2 | 2/2009 | Buckingham et al. | |
| 7,487,540 B2 | 2/2009 | Shipp | |
| 7,522,910 B2 | 4/2009 | Day | |
| 7,533,148 B2 | 5/2009 | Mcmillan et al. | |
| 7,536,437 B2 | 5/2009 | Zmolek | |
| 7,548,922 B2 | 6/2009 | Altaf et al. | |
| 7,568,002 B1 | 7/2009 | Vacanti et al. | |
| 7,610,342 B1 | 10/2009 | Pettigrew et al. | |
| 7,617,532 B1 | 11/2009 | Alexander et al. | |
| 7,627,670 B2 | 12/2009 | Haverkos | |
| 7,634,463 B1 | 12/2009 | Katragadda et al. | |
| 7,644,127 B2 | 1/2010 | Yu | |
| 7,647,383 B1 | 1/2010 | Boswell et al. | |
| 7,660,861 B2 | 2/2010 | Taylor | |
| 7,664,819 B2 | 2/2010 | Murphy et al. | |
| 7,693,945 B1 | 4/2010 | Dulitz et al. | |
| 7,707,157 B1 | 4/2010 | Shen | |
| 7,725,937 B1 | 5/2010 | Levy | |
| 7,739,338 B2 | 6/2010 | Taylor | |
| 7,783,597 B2 | 8/2010 | Kirsch | |
| 7,783,706 B1 | 8/2010 | Robinson | |
| 7,787,864 B2 | 8/2010 | Provo | |
| 7,797,443 B1 | 9/2010 | Pettigrew et al. | |
| 7,814,546 B1 | 10/2010 | Strayer et al. | |
| 7,818,800 B1 | 10/2010 | Lemley, III et al. | |
| 7,870,203 B2 | 1/2011 | Judge et al. | |
| 7,899,866 B1 | 3/2011 | Buckingham et al. | |
| 7,904,958 B2 | 3/2011 | Lee | |
| 7,941,490 B1 | 5/2011 | Cowings | |
| 7,991,411 B2 | 8/2011 | Johnson, Jr. et al. | |
| 8,041,769 B2 | 10/2011 | Shraim et al. | |
| 8,065,728 B2 | 11/2011 | Wang et al. | |
| 8,078,625 B1 | 12/2011 | Zhang et al. | |
| 8,095,118 B2 | 1/2012 | Boctor | |
| 8,165,049 B2 | 4/2012 | Salmi | |
| 8,228,832 B2 | 7/2012 | Black et al. | |
| 8,315,178 B2 | 11/2012 | Makhoul et al. | |
| 8,498,628 B2 | 7/2013 | Shapiro et al. | |
| 8,621,614 B2 | 12/2013 | Vaithilingam et al. | |
| 8,655,342 B2 | 2/2014 | Weinzierl | |
| 8,695,100 B1 | 4/2014 | Cosoi | |
| 8,769,671 B2 | 7/2014 | Shraim et al. | |
| 8,769,684 B2 | 7/2014 | Stolfo et al. | |
| 9,241,259 B2 | 1/2016 | Daniela et al. | |
| 2001/0037315 A1 | 11/2001 | Saliba et al. | |
| 2002/0087882 A1 | 7/2002 | Schneier et al. | |
| 2002/0120705 A1 | 8/2002 | Schiavone et al. | |
| 2002/0129140 A1 | 9/2002 | Peled et al. | |
| 2002/0133606 A1 | 9/2002 | Mitomo et al. | |
| 2002/0147915 A1 | 10/2002 | Chefalas et al. | |
| 2002/0162015 A1 | 10/2002 | Tang | |
| 2002/0194490 A1 | 12/2002 | Halperin et al. | |
| 2002/0199095 A1 | 12/2002 | Bandini et al. | |
| 2003/0018491 A1 | 1/2003 | Nakahara et al. | |
| 2003/0018903 A1 | 1/2003 | Greca et al. | |
| 2003/0084161 A1 | 5/2003 | Watson et al. | |
| 2003/0101348 A1 | 5/2003 | Russo et al. | |
| 2003/0172292 A1 | 9/2003 | Judge | |
| 2003/0177361 A1 | 9/2003 | Wheeler et al. | |
| 2003/0182421 A1 | 9/2003 | Faybishenko et al. | |
| 2003/0188197 A1 | 10/2003 | Miyata et al. | |
| 2003/0195852 A1 | 10/2003 | Campbell et al. | |
| 2003/0202536 A1 | 10/2003 | Foster et al. | |
| 2003/0217259 A1 | 11/2003 | Wong et al. | |
| 2004/0030913 A1 | 2/2004 | Liang et al. | |
| 2004/0034794 A1 | 2/2004 | Mayer et al. | |
| 2004/0039921 A1 | 2/2004 | Chuang | |
| 2004/0054498 A1 | 3/2004 | Shipp | |
| 2004/0088570 A1 | 5/2004 | Roberts et al. | |
| 2004/0111632 A1 | 6/2004 | Halperin | |
| 2004/0111636 A1 | 6/2004 | Baffes et al. | |
| 2004/0139160 A1 | 7/2004 | Wallace et al. | |
| 2004/0139165 A1 | 7/2004 | Mcmillan et al. | |
| 2004/0139351 A1 | 7/2004 | Tsang | |
| 2004/0153305 A1 | 8/2004 | Enescu et al. | |
| 2004/0162876 A1 | 8/2004 | Kohavi | |
| 2004/0187029 A1 | 9/2004 | Ting | |
| 2004/0203615 A1 | 10/2004 | Qu | |
| 2004/0255147 A1 | 12/2004 | Peled et al. | |
| 2004/0260924 A1 | 12/2004 | Peled et al. | |
| 2005/0015626 A1 | 1/2005 | Chasin | |
| 2005/0025291 A1 | 2/2005 | Peled et al. | |
| 2005/0027980 A1 | 2/2005 | Peled et al. | |
| 2005/0044156 A1 | 2/2005 | Kaminski et al. | |
| 2005/0048958 A1 | 3/2005 | Mousseau et al. | |
| 2005/0050222 A1 | 3/2005 | Packer | |
| 2005/0055327 A1 | 3/2005 | Agrawai et al. | |
| 2005/0066197 A1 | 3/2005 | Hirata et al. | |
| 2005/0080855 A1 | 4/2005 | Murray | |
| 2005/0080856 A1 | 4/2005 | Kirsch | |
| 2005/0086520 A1 | 4/2005 | Dharmapurikar et al. | |
| 2005/0111367 A1 | 5/2005 | Chao et al. | |
| 2005/0138109 A1 | 6/2005 | Redlich et al. | |
| 2005/0138353 A1 | 6/2005 | Spies | |
| 2005/0149726 A1 | 7/2005 | Joshi et al. | |
| 2005/0229250 A1 | 10/2005 | Ring et al. | |
| 2005/0256955 A1 | 11/2005 | Bodwell et al. | |
| 2005/0257261 A1 | 11/2005 | Shraim et al. | |
| 2005/0288939 A1 | 12/2005 | Peled et al. | |
| 2006/0010217 A1 | 1/2006 | Sood | |
| 2006/0020814 A1 | 1/2006 | Lieblich et al. | |
| 2006/0021031 A1 | 1/2006 | Leahy et al. | |
| 2006/0026681 A1 | 2/2006 | Zakas | |
| 2006/0031311 A1 | 2/2006 | Whitney et al. | |
| 2006/0031359 A1 | 2/2006 | Clegg et al. | |
| 2006/0036874 A1 | 2/2006 | Cockerille et al. | |
| 2006/0059238 A1 | 3/2006 | Slater et al. | |
| 2006/0068755 A1 | 3/2006 | Shraim et al. | |
| 2006/0095965 A1 | 5/2006 | Phillips et al. | |
| 2006/0098585 A1 | 5/2006 | Singh et al. | |
| 2006/0122957 A1 | 6/2006 | Chen | |
| 2006/0129644 A1 | 6/2006 | Owen et al. | |
| 2006/0168006 A1 | 7/2006 | Shannon et al. | |
| 2006/0168022 A1 | 7/2006 | Levin et al. | |
| 2006/0182141 A1 | 8/2006 | Duggirala et al. | |
| 2006/0206713 A1 | 9/2006 | Hickman et al. | |
| 2006/0212723 A1 | 9/2006 | Sheymov | |
| 2006/0251068 A1 | 11/2006 | Judge et al. | |
| 2006/0253537 A1 | 11/2006 | Thomas et al. | |
| 2006/0272024 A1 | 11/2006 | Huang et al. | |

(56) References Cited

U.S. PATENT DOCUMENTS

| | | |
|---|---|---|
| 2006/0277259 A1 | 12/2006 | Murphy et al. |
| 2006/0277280 A1 | 12/2006 | Craggs |
| 2006/0282890 A1 | 12/2006 | Gruper et al. |
| 2006/0288076 A1 | 12/2006 | Cowings et al. |
| 2007/0005762 A1 | 1/2007 | Knox et al. |
| 2007/0027965 A1 | 2/2007 | Brenes et al. |
| 2007/0028302 A1 | 2/2007 | Brennan |
| 2007/0067844 A1 | 3/2007 | Williamson et al. |
| 2007/0078936 A1 | 4/2007 | Quinlan et al. |
| 2007/0083929 A1 | 4/2007 | Sprosts et al. |
| 2007/0143424 A1 | 6/2007 | Schirmer et al. |
| 2007/0150827 A1 | 6/2007 | Singh et al. |
| 2007/0195779 A1 | 8/2007 | Judge et al. |
| 2007/0199054 A1 | 8/2007 | Florencio et al. |
| 2007/0220607 A1 | 9/2007 | Sprosts et al. |
| 2007/0226301 A1 | 9/2007 | Provo |
| 2007/0250920 A1 | 10/2007 | Lindsay |
| 2007/0260602 A1 | 11/2007 | Taylor |
| 2007/0261112 A1 | 11/2007 | Todd et al. |
| 2007/0282952 A1 | 12/2007 | Lund et al. |
| 2007/0294199 A1 | 12/2007 | Nelken et al. |
| 2007/0294428 A1 | 12/2007 | Guy et al. |
| 2007/0294524 A1 | 12/2007 | Katano |
| 2007/0299915 A1 | 12/2007 | Shraim et al. |
| 2008/0009268 A1 | 1/2008 | Ramer et al. |
| 2008/0040804 A1 | 2/2008 | Oliver et al. |
| 2008/0047017 A1 | 2/2008 | Renaud |
| 2008/0077517 A1 | 3/2008 | Sappington |
| 2008/0086638 A1 | 4/2008 | Mather |
| 2008/0100414 A1 | 5/2008 | Diab et al. |
| 2008/0184366 A1 | 7/2008 | Alperovitch et al. |
| 2008/0195707 A1 | 8/2008 | May et al. |
| 2008/0208980 A1 | 8/2008 | Champan et al. |
| 2008/0216168 A1 | 9/2008 | Larson et al. |
| 2008/0222253 A1 | 9/2008 | Bond et al. |
| 2008/0226069 A1 | 9/2008 | Tan |
| 2008/0250106 A1 | 10/2008 | Rugg et al. |
| 2008/0262991 A1 | 10/2008 | Kapoor et al. |
| 2008/0282338 A1 | 11/2008 | Beer |
| 2008/0282344 A1 | 11/2008 | Shuster |
| 2009/0007243 A1 | 1/2009 | Boodaei et al. |
| 2009/0064326 A1 | 3/2009 | Goldstein |
| 2009/0064330 A1 | 3/2009 | Shraim et al. |
| 2009/0100055 A1 | 4/2009 | Wang |
| 2009/0100518 A1 | 4/2009 | Overcash |
| 2009/0119402 A1 | 5/2009 | Shull et al. |
| 2009/0131035 A1 | 5/2009 | Aiglstorfer |
| 2009/0144823 A1 | 6/2009 | Lamastra et al. |
| 2009/0222920 A1 | 9/2009 | Chow et al. |
| 2009/0241173 A1 | 9/2009 | Troyansky |
| 2009/0241187 A1 | 9/2009 | Troyansky |
| 2009/0241191 A1 | 9/2009 | Keromytis et al. |
| 2009/0241196 A1 | 9/2009 | Troyansky et al. |
| 2009/0320135 A1 | 12/2009 | Cavanaugh |
| 2010/0017879 A1 | 1/2010 | Kuegler et al. |
| 2010/0024037 A1 | 1/2010 | Grzymala-busse et al. |
| 2010/0064347 A1 | 3/2010 | More et al. |
| 2010/0069127 A1 | 3/2010 | Fiennes |
| 2010/0077223 A1 | 3/2010 | Maruyama et al. |
| 2010/0077483 A1 | 3/2010 | Stolfo et al. |
| 2010/0095377 A1 | 4/2010 | Krywaniuk |
| 2010/0106781 A1 | 4/2010 | Gupta |
| 2010/0198928 A1 | 8/2010 | Almeida |
| 2010/0205265 A1 | 8/2010 | Milliken et al. |
| 2010/0257603 A1 | 10/2010 | Chander et al. |
| 2010/0269175 A1 | 10/2010 | Stolfo et al. |
| 2010/0312843 A1 | 12/2010 | Robinson |
| 2011/0078587 A1 | 3/2011 | Guy et al. |
| 2011/0087735 A1 | 4/2011 | Anderson |
| 2012/0047217 A1 | 2/2012 | Hewes et al. |

FOREIGN PATENT DOCUMENTS

| | | |
|---|---|---|
| CN | 101060421 A | 10/2007 |
| EP | 1058199 A2 | 12/2000 |
| EP | 1180889 A2 | 2/2002 |
| EP | 1329117 A1 | 7/2003 |
| EP | 1484893 A2 | 12/2004 |
| EP | 1494409 A2 | 1/2005 |
| EP | 1510945 A1 | 3/2005 |
| EP | 1571578 A1 | 9/2005 |
| EP | 1643701 A1 | 4/2006 |
| GB | 2418330 A | 3/2006 |
| WO | WO-96005549 A1 | 2/1996 |
| WO | WO-01075651 A2 | 10/2001 |
| WO | WO-2004077710 A2 | 9/2004 |
| WO | WO-2005010692 A2 | 2/2005 |
| WO | WO-2005017708 A2 | 2/2005 |
| WO | WO-05074213 A1 | 8/2005 |
| WO | WO-2005119488 A2 | 12/2005 |
| WO | WO 2006062546 A2 | 6/2006 |
| WO | WO-2006136605 A1 | 12/2006 |
| WO | WO-2007059428 A2 | 5/2007 |
| WO | WO-2007106609 A2 | 9/2007 |

OTHER PUBLICATIONS

"U.S. Appl. No. 13/691,544, Non Final Office Action dated Sep. 11, 2014", 14 pgs.

"U.S. Appl. No. 13/691,544, Notice of Allowance dated May 21, 2015", 7 pgs.

"U.S. Appl. No. 13/691,544, Notice of Allowance dated Sep. 9, 2015", 7 pgs.

"U.S. Appl. No. 13/691,544, Notice of Allowance dated Sep. 25, 2015", 4 pgs.

"U.S. Appl. No. 13/691,544, Preliminary Amendment filed Jul. 8, 2014", 3 pgs.

"U.S. Appl. No. 13/691,544, Response filed May 8, 2015 to Final Office Action dated Mar. 13, 2015", 11 pgs.

"U.S. Appl. No. 13/691,544, Response filed Nov. 14, 2014 to Non Final Office Action dated Sep. 11, 2014", 14 pgs.

"Bloom Filter—Wikipedia, the free encyclopedia", Internet Citation, [Online]. Retrieved from the Internet: <http://en.wikipedia.org/wiki/Bloom_filter>, (Mar. 1, 2009), 10 pgs.

"Clear Text Password Risk Assessment Documentation", SANS Institute, [Online] retrieved from the internet: <http://www.sans.org/reading_room/whitepapers/authentication/clear-text-password-risk-assessment-documentation_113>, (2002), 10 pgs.

"E-security begins with sound security policies", Symantec Corporation, Announcement Symantec, XP002265695, (Jun. 14, 2001), 1,9.

"International Application Serial No. PCT/EP2006/063474, International Search Report dated Sep. 21, 2006", 2 pgs.

"International Application Serial No. PCT/US2008/052483, International Search Report dated Feb. 18, 2009", 3 pgs.

"International Application Serial No. PCT/US2008/052483, Written Opinion dated Feb. 18, 2009", 6 pgs.

"International Application Serial No. PCT/US2010/035992, International Search Report dated Aug. 11, 2010", 4 pgs.

"Mean to Protect System from Virus", IBM Technical Disclosure Bulletin, vol. 37 No. 08, Aug. 1994, (Aug. 1, 1994), 659-660.

"National Institute of Standards (NIST) Special Publication 800-63", Electronic Authentication Guidelin, (Apr. 2006), 65 pgs.

"United Kingdom Application Serial No. 0512744.4, Search Report dated Oct. 1, 2005".

Aviv, et al., "SSARES: Secure Searchable Automated Remote Email Storage", 23rd Annual Computer, Security Applications Conference, (Jan. 2, 2008), 129-138.

Borck, James R, "Clearswift makes a clean sweep of Web threats", InfoWorld, [Online] Retrieved from the Internet : <http:l/www.infoworld.com/d/security-centrallclearswift-makes-clean-sweep-web-threats-818>, (Aug. 22, 2007), 2 pgs.

Broder, Andrei, et al., "Network Applications of Bloom Filters: A Survey, Internet Mathematics", (Apr. 13, 2004), 485-509.

Honoroff, Jacob, "An Examination of Bloom Filters and their Applications", [Online] Retrieved from the Internet : <http:l/cs.unc.edu/-fabian/courses/CS600.624/slides/bloomslides.pdf>, (Mar. 16, 2006), 113 pgs.

(56) References Cited

OTHER PUBLICATIONS

Kang, et al., "Two Phase Approach for Spam-Mail Filtering", Computational and Information Science, First International Symposium. vol. 3314, (2004), 800-805.

Long, John A, "Risk and the Right Model", http://www.dtic.mil/cgi-bin/GetTRDoc?Location=U2&doc=GEtTRDoc.pdf&AD=ADA 161757, (1986), 13 pgs.

Lyon, Adam, "Free Spam Filtering Tactics Using Eudora", (May 21, 2004), 1-4 pgs.

Ma, Zhe, "Research and Realization of Spam Filtering System", Outstanding Master's Document not Degree Thesis of China, Issue 2,, (Jun. 15, 2005).

Rubenking, Neil J., "Norton Confidential", [Online] Retrieved from the Internet : <http:l/www.pcmag.com/article2/0,28171999239,00.asp>, (Aug. 4, 2006), 2 pgs.

Ruffo, et al., "EnFilter: A Password Enforcement and Filter Tool Based on Pattern Recognition Techniques", ICIAP 2005, LNCS 3617, (2005), 75-82.

Shanmugasundaram, et al., "ForNet: A Distributed Forensics Network", In Proceedings of the Second International Workshop on Mathematical Methods, Models and Architectures for Computer Networks Security, (2003), 16 pgs.

Shanmugasundaram, et al., "Payload Attribution via Hierarchical Bloom Filters", CCS, (Oct. 25-29, 2004), 11 pgs.

Song, et al., "Multi-pattern signature matching for hardware network intrusion detection systems", IEEE Globecom 2005, (Jan. 23, 2006), 1686-1690.

Spafford, Eugene H., "Preventing Weak Password Choices", Computer Science Technical Reports 875, [Online]. Retrieved from the Internet: http://docs.lib.purdue.edu/cstech/875, (1991), 12 pgs.

Wang, et al., "MBF: a Real Matrix Bloom Filter Representation Method on Dynamic Set", 2007 IFIP International Conference on Network and Parallel Computing—Workshops Piscataway, (Sep. 18, 2007), 733-736.

Wang, Ping, "Research on Content Filtering-based Anti-spam Technology", Outstanding Document not 9 Master's Degree Thesis of China Issue 11, (Nov. 15, 2006).

Yang, et al., "Performance of Full Text Search in Structured and Unstructured Peer-to-Peer Systems", Proceedings IEEE Infocom, [Online]. Retrieved from the Internet: http://ieeexplore.ieee.org/stam_Q/stamp.jsp?arnumber=04146962, (2006), 12 pg.

Zhang, Yao Long, "Research and Application of Behavior Recognition in Anti-spam System", Outstanding Master's Degree Thesis of China, Issue 11, (Nov. 15, 2006).

METHOD AND APPARATUS FOR MAINTAINING NETWORK COMMUNICATION DURING EMAIL DATA TRANSFER

CROSS REFERENCE TO RELATED APPLICATIONS

This is a continuation application of U.S. application Ser. No. 13/691,544, filed Nov. 30, 2012, and entitled "METHOD AND APPARATUS FOR MANAGING THE TRANSFER OF SENSITIVE INFORMATION TO MOBILE DEVICES." The contents of this prior application is considered part of this application, and is hereby incorporated by reference in its entirety.

TECHNICAL FIELD

This disclosure relates to managing the flow of sensitive information to mobile devices. Specifically, implementations of a method and apparatus for managing the transfer of email to a mobile device are disclosed.

BACKGROUND

Use of mobile devices, such as smart phones, is being widely adopted across the business community. With this greater adoption, the users of mobile devices expect to use these devices to facilitate modern business processes. For example, smart phones are now used to access corporate email systems and other critical business systems that contain potentially vast amounts of sensitive information. This sensitive information may include, for example, health information (PHI), personally identifiable information (PII), financial information and confidential intellectual property. The existence of this sensitive information on mobile devices makes the information susceptible to data losses, for example, in cases in which the device is lost or stolen.

Apart from the damage to business secrecy and reputation, regulation within the United States and abroad poses substantial legal liabilities if information is lost due to its dissemination to a mobile device. Regulations such as the Health Insurance Portability and Accountability Act (HIPA), the Gramm-Leach-Bliley act (GLBA) and the privacy-protecting laws of various states and nations may require that the information assets within organizations should be monitored and subjected to an information protection policy in order to protect the privacy of customers and employees and to mitigate the risks of potential misuse and fraud.

Data Loss Protection (DLP) systems may provide a method of ensuring an organization's conformance with an established information protection policy. These systems may monitor information provided to mobile devices to ensure their conformance with the established policies. Mobile devices are provided by a variety of manufacturers and run a variety of operating system environments. For example, in 2012, operating systems such as Research in Motion®'s Blackberry® OS 7, Apple's® IOS®, Google's® Android®, and Microsoft® Windows Mobile® are popular. Developing client side applications for each of these operating environments can be time consuming and expensive. Because of the variety of mobile device configurations, employing DLP software for each mobile device presents challenges in terms of complexity and cost. Additionally, while digital rights standards provide one method for protecting digital data, use of DRM can become cumbersome when dealing with the diversity of data typically present in a corporate environment. Thus, there is a recognized need for a method and system that can manage the transfer of sensitive data to a mobile device that does not rely on specific mobile device client implementations.

SUMMARY

Embodiments of the disclosure may include a method of preventing the loss of sensitive data on a mobile device. The method may include receiving a request via a network from a mobile device for data, filtering a data set to produce a filtered data set, the filtering based, at least in part, on properties of the mobile device, and sending a response to the mobile device via the network, the response based, at least in part, on the filtered data set. In some embodiments, the properties of the mobile device include at least one of the mobile device model number, mobile device EUN, mobile device operating system, or mobile device location. In some embodiments, the properties of the mobile device include whether the mobile device is communicating over a secure channel.

In some embodiments, filtering the data set includes initiating filter processing of the data set to produce the filtered data, sending a plurality of portions of the response to the network request to the mobile device in separate network messages, at an interval that is less than a mobile device timeout value and greater than a timer value, while the filter processing of the data set is in progress. The mobile device timeout value may be based on the operating system of the mobile device. In some embodiments, each of the plurality of portions include four or less bytes of data and does not include data derived from the data set. In some embodiments, the timer value is greater than 500 milliseconds. In some embodiments, filtering the data set comprises initiating filter processing of the data set to produce the filtered data set, and while the filter processing of the data set is incomplete, setting a timer with a duration less than a mobile device timeout value, receiving notification that the timer has expired, and sending a portion of the response to the mobile device in response to expiration of the timer. Sending the response comprises completing transmission of the response in response to the completion of filter processing of the data set.

In some embodiments, a portion of the response comprises at least a portion of a http header. In some embodiments, a portion of the response comprises a portion of a WBXML file. In some embodiments, the method further includes sending a server request for the data set to a server in response to receiving the request from the mobile device, and receiving the data set from the server in response to the server request. In some embodiments, filtering the data set includes determining that a received email message is not authorized to be transferred to the mobile device, and including a block notification message in the filtered data set in response to the determining.

Some embodiments further include indicating the received email message is quarantined in the filtered email data set. Some other embodiments further include receiving an indication that the received email message is authorized to be transferred to the mobile device after sending the response to the mobile device, updating the filtered email data set to include the received email message; and in response to the indication, sending a first network message to data server, indicating a property of the received email message has changed from a first value to a second value, and in response to the indication, sending a second network message to the data server, indicating the property of the received email message has changed from the second value to the first value, receiving a second request from the mobile device for an data set, and sending a response to the mobile device including an indication that the received email message is authorized.

In some embodiments, the receiving notification, sending of a portion, and setting of a timer are iteratively performed until filter processing of the data set is complete. In some embodiments, the portions do not include email message data or attachments from the data set. In some embodiments, the request is an http or https request and the response comprises an http or https response.

Another aspect disclosed is an apparatus for preventing the loss of sensitive data on a mobile device. The device includes a processor, a memory operatively coupled to the processor, the memory storing a mobile device communication module, configured to receive a request for email data from the mobile device, and a data processing module, configured to filter a data set to produce a filtered data set, the filtering based, at least in part, on properties of the mobile device, wherein the mobile device communication module is further configured to send a complete response to the mobile device based, at least in part, on the filtered data set. In some embodiments, the data processing module is further configured to initiate filter processing of the data set to produce the filtered data set, and the apparatus further includes a connection management module configured to set a timer with a duration less than a mobile device timeout value while the filter processing of the data set is incomplete, to receive a notification that the timer has expired, and to send a portion of the response to the mobile device in response to expiration of the timer, if the timer expires while the filter processing of the data set is incomplete, and sending a complete response to the mobile device includes sending a remaining portion of the response to the mobile device in response to the completion of filter processing of the data set.

Another aspect disclosed is an apparatus for preventing the loss of sensitive data on a mobile device. The apparatus includes means for receiving a request for data from the mobile device, means for filtering a data set to produce a filtered data set, the filtering based, at least in part, on properties of the mobile device, and means for sending a complete response to the mobile device based, at least in part, on the filtered data set. In some embodiments, the means for filtering of the data set includes means for initiating filter processing of the data set to produce the filtered data set, and means for sending a plurality of portions of the response to the network request to the mobile device in separate network messages, at an interval that is less than a mobile device timeout value and greater than a timer value, while the filter processing of the data set is in progress.

Another aspect disclosed is a non-transitory computer readable medium, storing instructions that when executed by a processor perform a method of preventing the loss of sensitive data on a mobile device. The method includes receiving a request for data from the mobile device, filtering an data set to produce a filtered data set, the filtering based, at least in part, on properties of the mobile device; and sending a complete response to the mobile device based, at least in part, on the filtered data set. In an embodiment, filtering of the data set includes initiating filter processing of the data set to produce the filtered data set, while the filter processing of the data set is incomplete, setting a timer with a duration less than a mobile device timeout value, receiving notification that the timer has expired, and sending a portion of a response to the request to the mobile device in response to expiration of the timer. Sending a complete response comprises sending a remaining portion of the response to the mobile device in response to the completion of filter processing of the data set.

DETAILED DESCRIPTION

Figure 1:
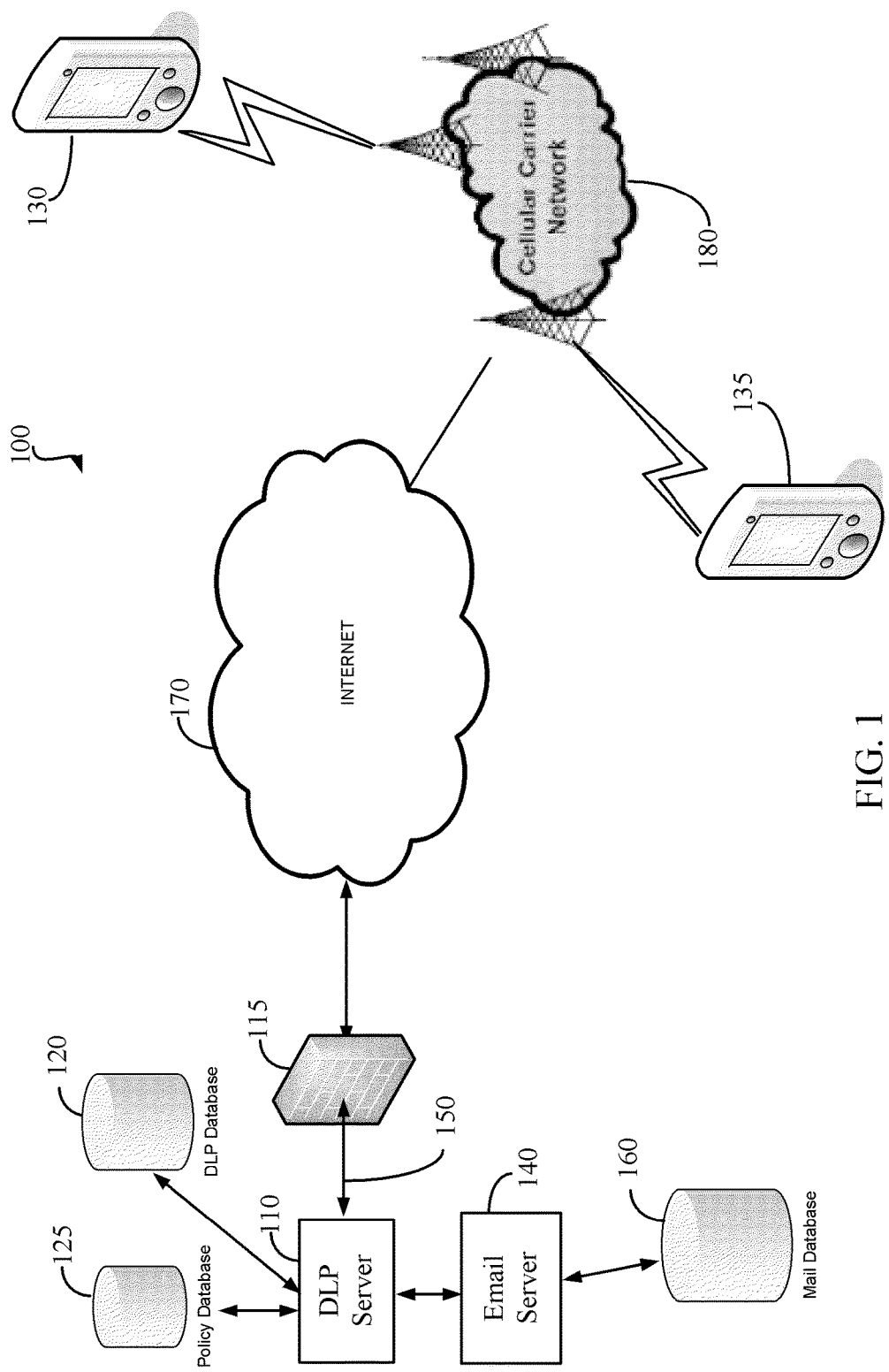
FIG. 1 is a conceptual overview diagram illustrating a communication system 100 including one implementation of a data loss protection system.

As described above, mobile devices present an opportunity to increase the productivity and flexibility of today's knowledge workers. This opportunity also presents potential risks that sensitive information may be lost if it is transferred to the mobile device. Previous corporate environments provided IT infrastructure that may have been bounded by corporate offices or perhaps an employee's personal residence. The prolific use of mobile devices increases the risk of data loss due to the portability of the devices and their higher risk of being lost or stolen than traditional tethered devices. A data loss prevention (DLP) solution configured to intercept, filter, and manage corporate data before it is sent to a mobile device may reduce the risk that sensitive data is lost. Such a DLP solution may operate on a communications network that connects the mobile device to the corporate network. For example, the DLP solution may be configured between the source of corporate data on the network and the mobile devices to be managed. In this configuration, all corporate data transferred to the mobile device must first pass through the DLP system. Such a configuration may also avoid some of the complexities discussed above when implementing a portion of the DLP solution on the client device.

One implementation of a DLP solution for mobile devices may operate in a reverse proxy configuration. For example, mobile devices may be configured to connect to a data loss prevention server to retrieve email data. The DLP server may then be configured to communicate with an email server such as a Microsoft Exchange Server® or a IMAP server to retrieve email data on behalf of the mobile client. After filtering the email data retrieved from the mail server based on data loss prevention policies, the reverse proxy DLP server may provide filtered email data to the mobile device.

In some implementations, the DLP server may remove or replace email messages that are not authorized by a DLP policy to be transferred to the mobile device. For example, a DLP policy may indicate that documents or emails marked confidential should not be transferred to a mobile device. The DLP server may replace an original email message that is marked confidential with a substitute or block email message. The block email message may, for example, indicate to the user that transfer of the original email message to the mobile device was prevented. The block email message may also indicate methods the user may employ to have the email message delivered to their mobile device. For example, some implementations may provide a link in the substitute email. When the link is selected by a user, the DLP server may be notified that the user believes the original email should be transferred to the mobile device. Alternatively, the block email may include a message in some implementations asking the user to contact an administrator to request a particular email be sent to their mobile device. The DLP server may then provide for an administrative interface. The administrative interface can enable an administrator to override a DLP policy and allow a particular email to be delivered to the mobile device.

After a DLP server has been notified that a previously blocked email is now authorized for transfer to the mobile device, some implementations may resynchronize the mobile device's email with the DLP server. In an embodiment, this resynchronization may provide an opportunity for the DLP server to replace the previously sent block email message with the original email. In another embodiment, the resynchronization by the mobile device initiates a sequence that makes the original message available for synchronization.

In some implementations, a protocol for mail synchronization between the mobile client and an email server (or DLP server operating in a reverse proxy configuration) may define that the mobile device initiates the resynchronization. In some implementations, the DLP server may recognize that a resynchronization is needed. For example, the DLP server may manage an initial blocking of an email by DLP policies and a subsequent unblocking of the email by a user or an administrator. While this may result in the DLP server having information that the mobile device's email is out of sync with the email data of the DLP server, the synchronization protocol may define that the mobile device initiates the synchronization.

To cause the mobile client to perform a resynchronization as defined by the mail synchronization protocol, the DLP server may indicate to the mobile client that one or more properties of an email previously synchronized have changed. For example, the DLP server may indicate that the folder of an email message has changed from the inbox to a quarantine folder. The DLP server may then indicate to the mobile device client that the email message folder has changed from the quarantine folder to an inbox folder. In some other implementations, other properties or a single property of a data item, for example, an email message, may be modified to cause the mobile device to resyncronize.

This movement of email messages from one folder to another may cause the mobile device email client to resynchronize its folders with the DLP server. During the resynchronization, the mobile device client may request at least email header information for the original email that was blocked during the first email synchronization. The DLP server may then respond with email header information for the original email and not for the block email. This resynchronization may therefore provide a mechanism for the DLP server to "unblock" a previously blocked email message.

In some implementations, the DLP servers location between mobile devices and a data source such as a mail server may allow the DLP server to maintain a database of information relating to data received from the data source. For example, if the data source is an email server, results of the analysis of a first mobile device user's email and its relation to DLP policies may be stored in a DLP database. For example, identifying characteristics of the email may be stored in the DLP database. From, to, subject, or other header fields may be stored in the DLP database and used to uniquely identify the email. Alternatively, checksums or other hashing techniques may be used to generate a unique identifier for the email. Still other implementations may be provided with a unique identifier by the email server. Results of the DLP analysis may also be stored in the DLP database. For example, in some implementations, a document or email may be categorized into one of several categories. Since an email message may be sent to multiple recipients, a second mobile device user may receive the same email. Because the DLP server may analyze the same email on behalf of multiple email users, analyzing an email on behalf of a first recipient may benefit from a prior analysis of the email on behalf of a second recipient. This may result in the analysis of the email on behalf of the first email user being processed more efficiently in some implementations.

The DLP server may retrieve email for a mobile device from an email server. The email data received from the email server may be processed by the DLP server to determine which emails included in the email data are authorized by DLP policies for transfer to the mobile device and which emails are unauthorized. The time necessary to complete this processing may vary based on the size of the email data retrieved from the email server. While this processing is in progress, the mobile device may be waiting for a response to a synchronization request sent to the DLP server. In some cases, the time necessary for the DLP server to complete this processing so it can respond to the resynchronization request of the mobile device may exceed a timeout value of the mobile device.

To prevent the mobile device from timing out while it processes the email data, the DLP server may send portions of a response message to the mobile device while it processes the email data. These portions of a response may be sent periodically, for example, at an interval less than the timeout value of the mobile device. The portions of the response may include header information such as http response headers or file headers included in an http response body. Some email synchronization protocols specify a response format that provides fields at the beginning of the response that may be knowable before all the response data from the email server has been processed. In these implementations, the knowable fields may be sent as part of the partial responses discussed above. In other implementations, some fields may not be knowable until all the email data has been processed. In these implementations, any partial response data sent to the mobile device to prevent it from timing out may precede the fields of the response that are unknown.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

FIG. 1 illustrates a communication system 100 including one implementation of a data loss protection system. In an embodiment, the communication system 100 includes mobile devices 130 and 135 connected to a cellular carrier network 180. The cellular carrier network is also connected to the Internet 170 so that Internet data may pass between the cellular network and the Internet. Also connected to the Internet 170 through a firewall 115 is a DLP server 110. In other embodiments, the mobile device 135 may communicate directly over the Internet. For example, the mobile device 135 may support a wireless networking standard such as 802.11 to establish and maintain Internet connectivity.

The DLP server 110 may be configured to communicate with an email server 140. In some implementations, the DLP server 110 may function in a reverse proxy configuration. As illustrated, the reverse proxy configuration provides for the mobile devices 130 and 135 to be configured so as to retrieve their email data directly from the DLP server 110. When the DLP server receives a request for email data from one of the mobile devices 130 or 135, the DLP server 110 may then request email data for the corresponding mobile device from the email server 140. To obtain the email data for a mobile device, the DLP server may provide email account authentication information to the email server. For example, when requesting email data for mobile device 130, DLP server 110 may provide email account login information for the user of mobile device 130.

The DLP server may also utilize a DLP database 120 and a policy database 125 to provide data loss protection services. For example, the policy database 125 may include policies that define categories of email data and email attachment data. The DLP server may perform categorization of email messages retrieved from email server 140 and determine an action for emails of the determined categories based on policy data retrieved from policy database 125.

The DLP database 120 may be used by the DLP server to store information related to analysis of email data received from the email server 140. For example, the DLP server may perform processing of email data received from the email server 140 in order to characterize or otherwise categorize the sensitivity of email data received from email server 140. Because several recipients may receive the same email data, DLP server 110 may reduce the computation time required to process the email data received by multiple email users by storing results of the analysis of email data to DLP database 120. When email data is received for a user from email server 140, the DLP server may first search the DLP database 120 to determine if analysis of the email data has already been performed, for example, on behalf of another user who retrieved their email from the email server first. If the email data was previously analyzed, the appropriate DLP policies may be applied to the email data more efficiently than if the email data is reanalyzed.

While FIG. 1 illustrates a DLP server operating in a reverse proxy configuration, other configurations are also contemplated. For example, other DLP implementations may not provide a separate DLP server, but instead utilize a plug-in architecture with an email server. In these implementations, the email server software may define one or more interfaces to enable $3^{rd}$ party software modules to intercept and modify email data as it is processed by the email server software. Some DLP implementations may use these plug-in architectures to perform their DLP functions. For example, Microsoft Exchange Server provides several SDKs that may be utilized to implement a DLP solution. Other email servers offer similar interfaces, for example, the popular "sendmail" email server also provides a plugin facility.

Figure 2:
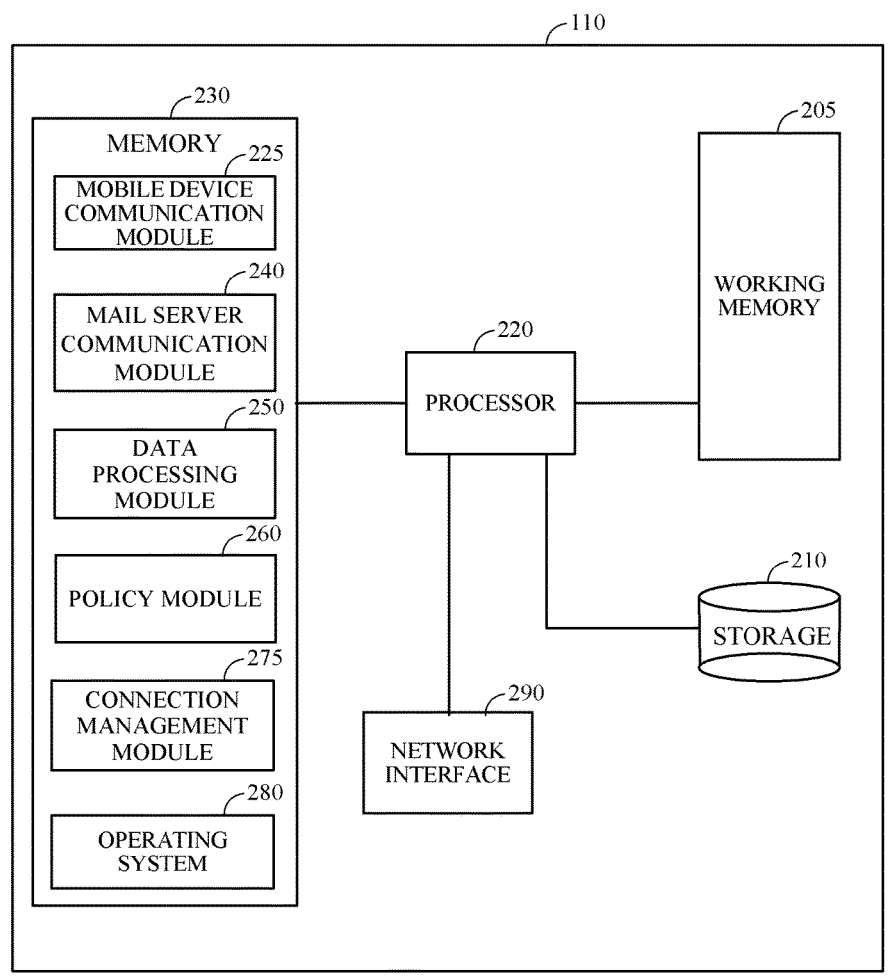
FIG. 2 is a functional block diagram illustrating one implementation of a DLP server.

FIG. 2 is a functional block diagram of one implementation of a DLP server 110. While FIG. 2 shows DLP server 110 as one physical device, it should be understood that some implementations may distribute the functions of DLP server 110 (or some sub-modules of DLP server 110) across multiple physical devices. DLP server 110 includes a processor 220 operably connected to a memory 230, network interface 290, storage 210, and working memory 205. The memory 230 stores modules that include instructions for the processor 220. Instructions stored in the modules configure the processor 220 to perform the functions of DLP server 110. For example, a mobile device communication module 225 includes instructions that configure processor 220 to communicate with a mobile device. For example, the mobile device communication module 225 may configure the processor 220 to communicate with mobile device 130 or 135 illustrated in FIG. 1. The instructions in the mobile device communication module may configure the processor 220 to receive a network request for email data from the mobile device. For example, the mobile device communication module's instructions may implement an http server that accepts http requests from the mobile device. The http requests from the mobile device may include http "get" requests that request mail documents, based on one or more parameters. Therefore, instructions in mobile device communication module 225 represent one means for receiving a network request for email data from the mobile device.

Memory 230 includes a mail server communication module 240. Mail server communication module 240 includes instructions that configure the processor 220 to communicate with a mail server, such as mail server 140 illustrated in FIG. 1. For example, if mail server 140 is a Microsoft Exchange server, mail server communication module 240 may configure processor 220 to perform the active sync protocol with mail server 140. If the mail server 140 is a IMAP server, mail server communication module 240 may configure the processor 220 to perform the IMAP protocol with mail server 140.

Memory 230 also includes a data processing module 250. Instructions in the data processing module 250 configure processor 220 to process data retrieved from an email server, such as email server 140 of FIG. 1. For example, instructions in the data processing module 250 may parse data received from an email server to identify individual email messages. Instructions in the data processing module 250 may also identify characteristics of each email identified. For example, the sender, distribution list, title, results of keyword searches, and type and classification of any email attachments may also be identified. Instructions in the data processing module 250 may also invoke subroutines in a policy module 260 to determine an appropriate policy to apply to each email being processed.

The policy module 260 may receive email data content as well as parameters to determine which policy should be applied to a particular email. For example, the policy module 260 may receive parameters corresponding to properties of the mobile device. Those properties may include, for example, the mobile device model number, EUN, operating system, authenticated device owner, or location of the device. Whether the mobile device is communicating over a secure channel may also determine what policy is applied by the policy module 260. The policy module 260 may also receive parameters relating to the email. For example, distribution list parameters such as "from:", "to:", "subject" fields may be received by the policy module. The policy module 260 may determine a policy to apply to the email based on one or more of the above parameters. Based on the policy applied, the data processing module 250 may then remove or replace one or more emails from the email data received from the email server 140 to create filtered email data. Therefore, instructions in the data processing module 250 represent one means for filtering an email data set to produce a filtered email data set, the filtering based, at least in part, on properties of the mobile device.

The filtered email data may then be transmitted to the mobile device via the mobile device communication module 225. For example, the filtered email data may be included in an http or https response message that is produced in response to an http request message received from the mobile device. Therefore, instructions in the mobile device communication module 225 may represent one means for sending a network response to the mobile device, based, at least in part, on the email data set.

Memory 230 also includes a connection management module 275. The connection management module 275 may manage a connection between the DLP server 110 and a mobile device. When a mobile device sends a request for email to the DLP server, the mobile device may track the time elapsed before a reply to its request is received. If no response is received before the elapsed time exceeds a threshold, the mobile device may reset the connection with the DLP server or otherwise stop communication with the DLP server. If this occurs, no email data may be transferred between the DLP server and the mobile device. The failure to transfer the email data to the mobile device may impact the mobile device user's ability to communicate via email in a satisfactory manner, reducing customer satisfaction.

In some instances, the delay in responding to the mobile device may be caused by processing constraints on the DLP server 110. Alternatively, the amount of data processed by the DLP server before a response can be sent to the mobile device may also contribute to a delay in responding to the mobile device request for email data. Some processing constraints may be transitory. If the processing constraints are transitory, a reattempt to receive, for example, an email from the DLP server by the mobile device may be successful. However, other conditions resulting in long delays in responding to the mobile device may not be transitory. This may result in most or every request by the mobile device to receive data from the DLP timing out. For example, if a user's inbox receives several email messages without resynchronizing, the amount of email data waiting to be received by the mobile device may accumulate at a server. When the mobile device eventually requests the data, the DLP server may receive a large data set from the server 140 in response to its request. The processing time for the large data set may exceed the mobile device timeout in all processing circumstances.

To prevent the mobile device from closing the connection with the DLP server, the connection management module 275 is configured to periodically send data to the mobile device while the data received from an email server is being processed. For example, email data may be periodically sent to the mobile device as described below.

In some implementations, the processing of email data received from an email server may proceed sequentially. For example, email data from an email server may be comprised of a series of email messages, with each email message processed in serial order and individually applied against DLP policies. In these implementations, as emails are authorized for transmission to the mobile device, these emails may be stored at the DLP server 110. Portions of these emails may be periodically sent to the mobile device to maintain the connection with the mobile device. When all of the email data received from the email server has been processed, authorized emails may be sent at the full rate supported by the connection between the DLP server 110 and the mobile client.

In other implementations, an email synchronization protocol between the DLP server 110 and the mobile device may restrict the ability of the DLP server to send DLP authorized emails to the mobile device until all email data from the email server has been processed. For example, in some implementations, the synchronization protocol may be defined to include data fields that are only known after all email data has been fully processed. For example, some email synchronization protocols may define that a total length field is sent by the DLP server 110 to the mobile client before any authorized email message data is transferred. For example, some email synchronization protocols, such as Microsoft® ActiveSync®, transfer data using a WBXML file format. The WBXML file format may prevent portions of email data from being sent to the mobile device until the length of the WBXML file is known. Knowing the value of the length field of the WBXML file may require that all email server data be processed before the email data or WBXML file may be transmitted to the mobile device.

In some of these implementations, the mobile device's request to the DLP server 110 may timeout before the processing of the email data has been completed. In these implementations, portions of a response may be sent to the mobile device at a time interval sufficient to prevent the mobile device from timing out before the DLP server is able to fully process the email data it receives from an email server.

To accomplish this, the DLP server 110 may set a timer that is less than a mobile device timeout value. The mobile device timeout value may be set by some implementations of the DLP server 110 based on the operating system of the mobile device. In some implementations, the mobile device timeout value may be, for example, more than 500 milliseconds, or more than one (1) second, or more than five (5) seconds. Therefore, instructions in the connection management module 275 represent one means for setting a timer with a duration less than a mobile device timeout value while filter processing of an email data set is incomplete. When the timer expires, portions of the response to the mobile device's request may be sent to the mobile device. Therefore, instructions in the connection management module 275 represent one means for receiving notification that a timer has expired while the filter processing of an email data set is incomplete. The result of this process is that the DLP server may transmit one or more messages within a timeout window of the mobile device, but before processing of the data set is completed.

In an embodiment, the processing of the response from the email server 140 may still be in progress when it is time to send a message to the mobile device. Therefore, it may not be possible to send the full response to the mobile device. For example, if some email messages have not yet been processed by the DLP server 110, a total length value for the response message may be unknown. In these implementations, only response data that precedes the total length field in the response may be sent before all the processing of the data has been completed.

Portions of http headers may be sent to the mobile device while the processing of email data from an email server is in process. For example, an http response may include a status line, general headers, response headers, and entity headers. Some of these header fields may be sent to the mobile device before processing of all email data received from the email server is complete. The connection management module 275 may send portions of this header data to the mobile device to maintain the connection to the mobile device. Additionally, in some implementations utilizing a WBXML file to transfer data between the DLP server 110 and the mobile device, some portions of the WBXML file may be known before all processing of data received from the email server is complete. In these implementations, the known portions of the WBXML file may be sent in addition to the http header information described above. Therefore, instructions in the data processing module 250 also represent one means for sending a portion of a response to a network request to the mobile device in response to expiration of a timer. Additionally, instructions in the data processing module 250 may also represent one means for transmitting one or more portions of a response to the mobile device before processing of a data set received by a server is complete. The portions of the response may not include any portion of the processed data set. For example, the portions may only include header or control information.

Memory 230 also includes an operating system module 280. Operating system module 280 includes instructions that configure the processor 220 to manage the overall hardware and software resources of the DLP server 110. For example, the operating system module 280 may include instructions for utilizing threads of execution, setting timers, or for communicating with other components of the DLP server 110 such as the network interface 290, a storage 210, or a working memory 205. The data processing module 250 may, for example, create a thread of execution by calling subroutines in the operating system module 280. As illustrated below in FIG. 7, this thread of execution may be used to perform filter processing of an email data set to produce filtered email data. Therefore, instructions in the data processing module 250 and operating system module 280 may represent one means for initiating filter processing of an email data set to produce a filtered email data set.

The working memory 205 may be used by the processor 220 to store dynamic data created as the DLP server 110 operates. For example, instructions from one or more of the modules in memory 230 may be copied from memory 230 into the working memory 205 before being executed by the processor 220. In other embodiments, working memory 205 may be used for stack space or heap space to facilitate execution of the modules of memory 230. The storage 210 may be used to store the results of a DLP analysis on one or more email messages received from an email server. Storage 210 may also be used to store DLP policy information that is applied by the DLP server 110 to determine whether an email from an email server should be transferred to a mobile device. The network interface 290 is used by the processor 220 to communicate on a network, for example, network 150 illustrated in FIG. 1.

Figure 3:
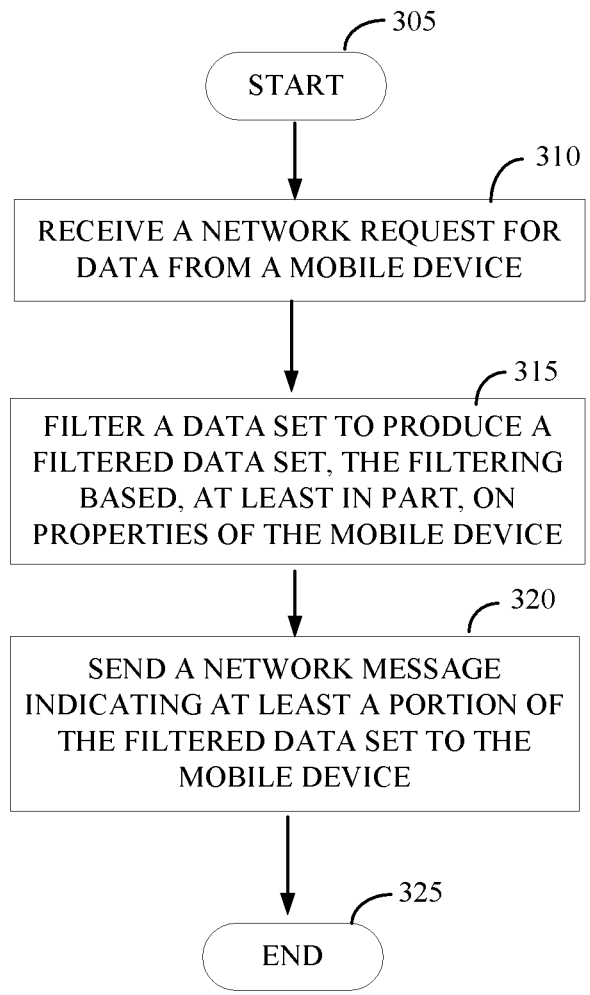
FIG. 3 is a flowchart illustrating one embodiment of a method for managing sensitive information on mobile devices.

FIG. 3 is a flowchart illustrating one embodiment of a method for managing sensitive information on mobile devices. Process 300 may be performed by a DLP server operating in an email proxy configuration, as illustrated in FIG. 1. Process 300 may be implemented by instructions included in the memory 230 of FIG. 2. Process 300 begins at start block 305 and then moves to processing block 310, where a network request for data is received from a mobile device. In some implementations, the network request may request that any data items not previously transmitted to the mobile device be transmitted to the mobile device. In an embodiment, the data items may be email messages. For example, in some embodiments, a mail exchange protocols may assign an identifier to each email message. In these implementations, the network request may include the identifier for the most recent email received by the mobile device. In an embodiment, the identifier may be passed through the DLP server to an email server, which may generate a list of emails that should be sent to the device. The email server may then send the generated list of emails to the DLP server.

Process 300 then moves to processing block 315, where a data set is filtered to produce a filtered data set, the filtering based, at least in part, on properties of the mobile device. For example, the data set created by the server based on the identifier described above may be filtered based on the location of the mobile device, the manufacturer of the mobile device, the model number of the mobile device, or the operating system version of the mobile device. The data may also be filtered based on the user logged into the mobile device or assigned to the mobile device. The data may also be filtered based on the nature of the communications channel between the mobile device and the DLP server. For example, if the mobile device is communicating over an unencrypted wireless channel, the DLP policy applied to the transfer of data to the mobile device may be different than if the communications channel between the mobile device and the DLP server 110 is encrypted.

In an embodiment, the data set may also be filtered based on analysis of the content of the data set. For example, content of the data set may be analyzed to determine if any payment card industry (PCI) data is included in the data set. If such data is included, the data may be filtered to prevent transfer of the PCI data to the mobile device. In an embodiment, the data set may be analyzed to determine if any personally identifiable information (PII) is included in the data set. If PII data is included, the PII data may be blocked or filtered so as to prevent the PII data from being transferred to the mobile device. In an embodiment, the content of the data set may be analyzed against a database of fingerprinted content. If a match is found, the data set may be filtered to remove the fingerprinted content. Alternatively, a matching fingerprint in the data set may invoke other actions as defined by a policy. For example, an alert may be generated, the content in the data may be quarantined, or the fingerprinted content may be removed from a data item included in the data set, while the remaining content in the data item included in the data set is transferred to the mobile device.

Process 300 then moves to block 320, where a network message is sent to the mobile device indicating at least a portion of the filtered data set. For example, the network message sent to the mobile device may include at least a portion of the filtered data set. The mobile device may then use the filtered data set to display one or more email messages or attachments to a user of the mobile device. Process 300 then moves to end state 325 where it terminates.

Figure 4:
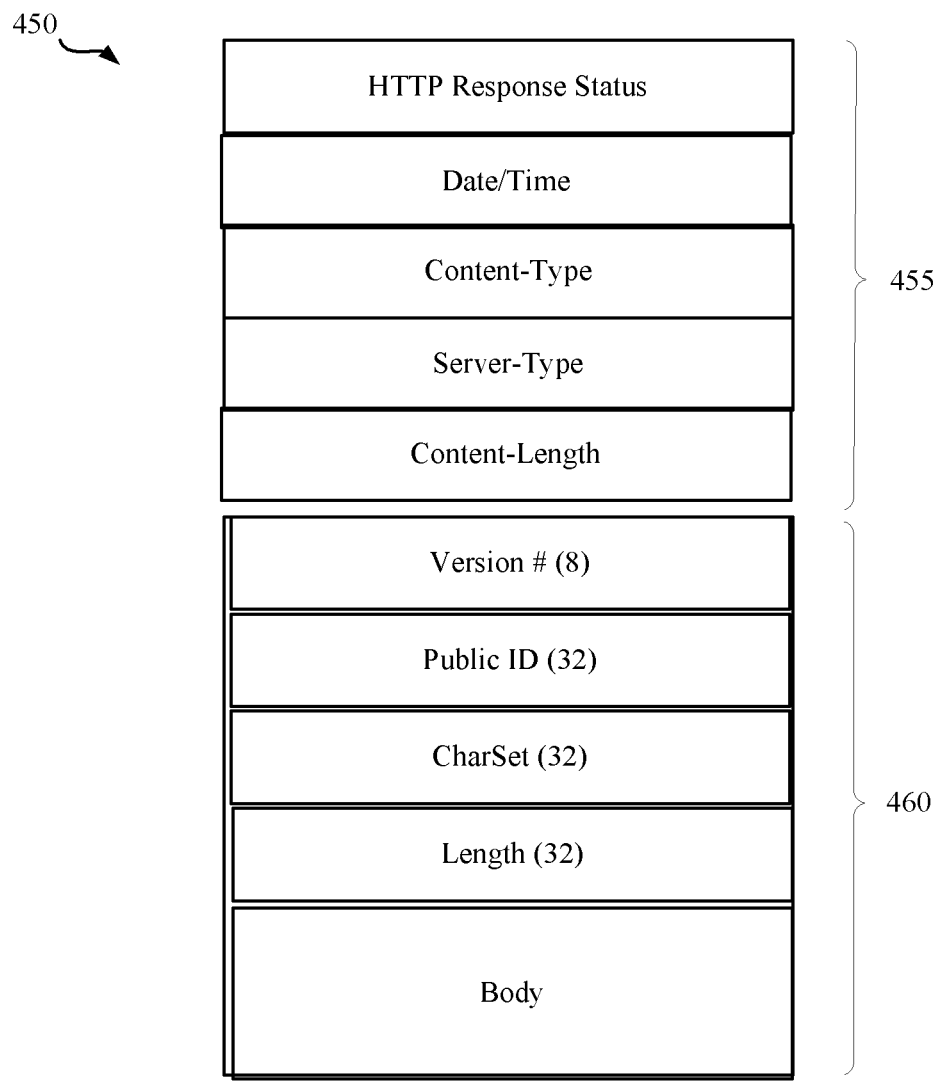
FIG. 4 is a data format diagram for one embodiment of a http response message.

FIG. 4 illustrates an example data format of an http response message. A data protocol between a client (such as mobile devices 130 or 135 illustrated in FIG. 1) and a server (such as email server 140 illustrated in FIG. 1) may utilize http for communication between the client and server. In some implementations, an http response message may include one or more http header fields 455 as shown. For example, http header fields may include an http response status, a date/time field, content-type specifier, server-type specifier, or a content-length. Other http response fields are known in the art. In some implementations, one or more http response fields may contain information regarding the move device user. For example, http response fields may indicate a username or domain of the user of the mobile device.

An http response may also include a data portion 460. For example, in some implementations the data portion 460 of the http response may be formatted as a WBXML file. A WBXML file may include data fields 460 as shown in FIG. 4. For example, a WBXML file may include a version number, public ID, charset specifier, length, and body fields. As described above, some implementations may send one or more portions of a response to a mobile device. These portions may be sent periodically or at time intervals less than a mobile device timeout value. By sending portions of a response, the mobile device may be prevented from timing out and resetting a connection between the mobile device and, for example, a DLP server 110 or email server 140. The portions of the response may include one or more of the fields described above. For example, because the http or https header fields described above and in FIG. 4 may be known before response data from a server has been completely processed by a DLP server, these http or https header fields or portions of these http or https header fields may be periodically sent to the mobile device to maintain the connection between the mobile device and the DLP server 110. For example, portions of one, two, three, four, five, six, seven, eight, or more bytes may be sent to the mobile device.

Figure 5:
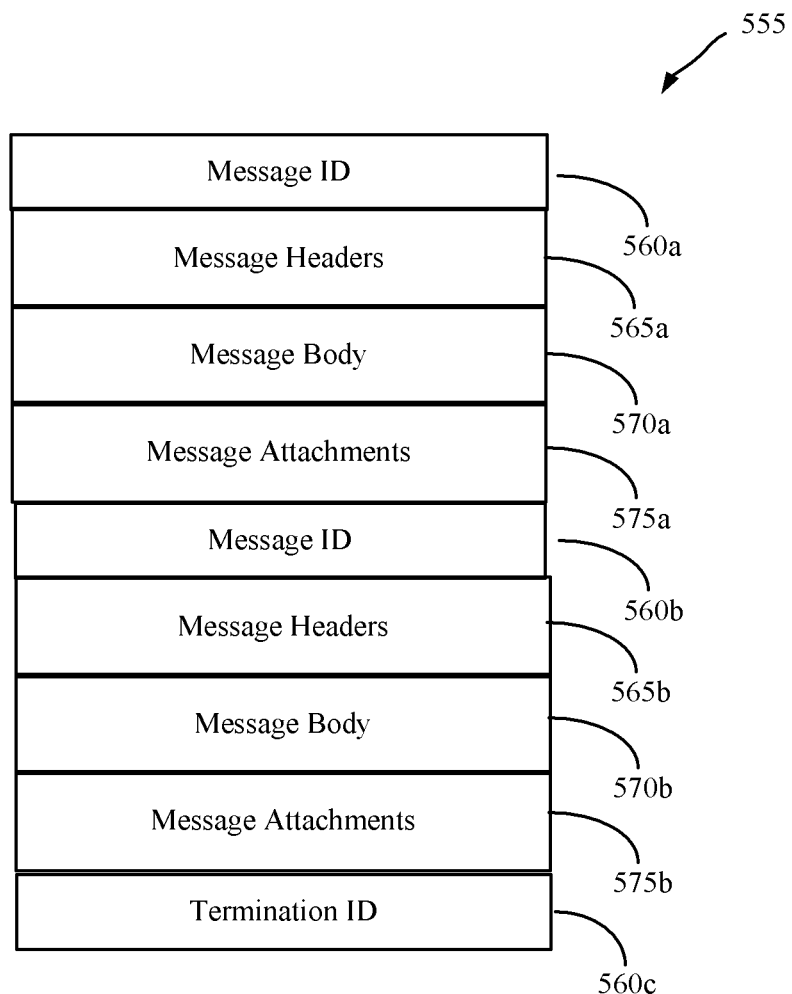
FIG. 5 is a data format diagram illustrating one embodiment of a portion of a response data in an email response message sent from an email server to a DLP server or an email client.

FIG. 5 illustrates an example data format for a portion of response data in an response message sent from a server to a DLP server or a client. The portion of the response data illustrated is comprised of a series of message IDs and corresponding data. For example, message ID 560*a* may identify the email message defined by message headers 565*a*, message body 570*a*, and any message attachments 575*a*. Similarly, message ID 560*b* may identify the email message defined by message headers 565*b*, message body 570*b*, and any message attachments 575*b*. Termination ID 560*c* may be set to a predetermined value indicating that no further email messages are contained in the portion of response data 555.

A DLP server may selectively replace or remove individual emails from email data received from an email server before sending the email data to a mobile client. For example, if DLP policies indicate a particular email is not authorized to be sent to the mobile device, the DLP server 110 may remove or replace the email from the email data. In some implementations, the DLP server may remove the message id, message header, message body, and message attachment data from the email response data. In other implementations, the DLP server may maintain the same message ID in the email response data, but may substitute different message headers, message body, and message attachments for an email that is not authorized for transmission to the mobile device by DLP policies. For example, the DLP server 110 may substitute an email block message body for a message body not authorized by the DLP policies.

Later, if the DLP server 110 is notified that the original email message is authorized for transmission to the mobile device, the DLP server 110 may perform a series of actions that allow the DLP server to substitute the block message (with a particular identifier) with the original email message. For example, in some implementations, the DLP server may move the block email message to a different folder, and then move it back to an inbox folder. This operation may cause the email server to generate a new identifier for the message. In an embodiment, this new identifier may allow the DLP server to substitute the block email message with the original email message. Because a new identifier now exists, the mobile device may resyncronize to obtain the new message identifier.

FIG. 5 illustrates one possible data format for a portion of the response data in an email response message sent from an email server to an email client. The email client may include a DLP server 110, for example, a DLP server operating in a reverse proxy configuration. Other implementations may utilize the Microsoft® ActiveSync® protocol. The format of the Microsoft® ActiveSync® protocol is known in the art. Alternatively, some implementations may utilize the IMAP protocol to transfer email between an email server and an email client. The format of the IMAP protocol is also known in the art.

Figure 6:
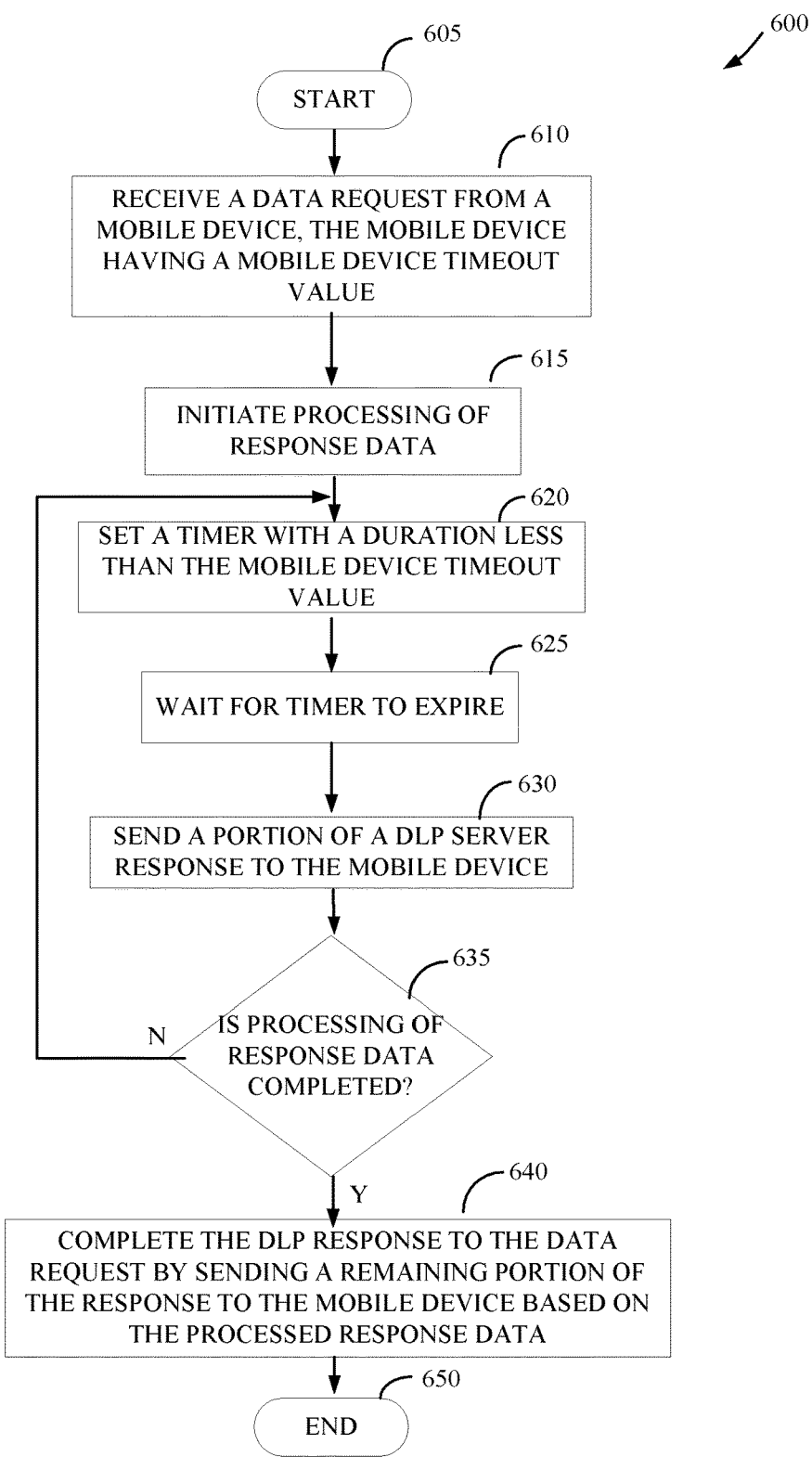
FIG. 6 is a flowchart illustrating one embodiment of a method for managing the transfer of sensitive data to a mobile device.

FIG. 6 is a flowchart illustrating an embodiment of a method for managing the transfer of sensitive data to a mobile device. Process 600 may be implemented by instructions included in the modules stored in memory 230, illustrated in FIG. 2. Process 600 may also be implemented as part of processing block 315, illustrated in FIG. 3. Process 600 begins at start state 605 and then moves to processing block 610 where a data request from a mobile device is received.

The mobile device has a mobile device timeout value. This timeout value may vary based on the mobile device. For example, different mobile device operating systems may use different timeout values. Alternatively, some mobile device email applications may use different mobile device timeout values. For example, a Microsoft Exchange® client implemented on an Apple® iPhone® may use a different mobile device timeout value than a Microsoft Exchange® client implemented on a mobile phone running the Android® operating system or a mobile phone running the Windows Mobile® operating system.

The mobile device may in some implementations open a TCP connection to the DLP server 110. The mobile device may then send in some other implementations an http or https request message to the DLP server. The http or https request message may include one or more commands, for example, a command to synchronize one or more folders of the email system present on the mobile device. When the mobile device sends the http request, it may also set a timer to track the amount of time elapsed between when the http(s) request is sent to the DLP server and when a response is received. This timer may expire after a predetermined amount of time elapses from when the timer is set.

The predetermined amount of time may be a mobile device timeout value. Mobile device timeout values may vary by the implementation of the mobile device. For example, a mobile device timeout value could be between one (1) second and sixty (60) seconds or longer. Some implementations of mobile devices may implement at least two timer values. One timer value may be used to track a first response from a server in communication with the mobile device. A second time value may be used to track subsequent responses from the server in communication with the mobile device.

The timer may facilitate the mobile device's management of open network connections. For example, if a response is received from the DLP server 110 before the timer elapses, the mobile device may cancel the timer. If no response is received from the DLP server before the timer elapses, the mobile device may determine that the DLP server 110 has become unresponsive. The mobile device may then reset the TCP connection between the mobile device and the DLP server 110. As a result, the mobile device's email application may also transition to an "offline" operating mode, and retry connecting to the DLP server 110 at a later time. The mobile device timeout value referenced in processing block 610 may be the amount of elapsed time between the mobile device's sending of a request to the DLP server 110 to retrieve email data, and the time the mobile device "gives up" on receiving a reply from the DLP server 110, and closes the connection between the DLP server and the mobile device.

Process 600 then moves to processing block 615, where processing of response data is initiated. In some implementations, the response data may be data received in a response from an email server, such as email server 140 illustrated in FIG. 1. To obtain the response data from the email server 140, some implementations may first send a request for data to the email server 140. For example, in some implementations, after a DLP server 110 performing process 600 receives a request from a mobile device as described in processing block 610 above, the DLP server may initiate a request for email data to an email server, such as email server 140 illustrated in FIG. 1. This request for email data may include email account information for the user of the mobile device sending the data request in processing block 610. In response, the email server may send email server response data to the DLP server 110. The email server response data may include data corresponding to one or more email messages or one or more email attachments. For example, the response data may include portions of response data as illustrated in FIG. 5. The response data may also include other information, such as header or control information.

Processing block 615 initiates processing of response data received from an email server. One implementation of processing of response data is described in FIG. 8 below. This processing of the response data by the DLP server running process 900 may require more than a negligible amount of processing time. For example, processing of the response data may require more than five milliseconds in some implementations.

In some implementations, processing of the response data is performed on a separate thread of execution from process 600. This is illustrated further below in FIG. 7. For example, processing block 615 may include the creation of or allocation of a thread of execution to perform the processing of response data. This thread of execution may be an independent process with its own address space and I/O channels, or it may be a lighter weight thread that shares an address space and I/O channels with other threads.

Process 600 then moves to block 620, where a timer is set with a duration less than the mobile device timeout value. This timer is used in some implementations to ensure that data is sent over the connection to the mobile device before the mobile device resets the connection due to a lack of any response data being received. The timer set by the DLP server 110 may be configured to be less than the mobile device timeout value. For example, if the mobile device timeout value is 60 seconds, the timer set by the DLP server may be set to be 50 seconds, to ensure the DLP server is able to send a portion of a response to the mobile device before the mobile device timer expires. In some implementations, the timer set by the DLP server may be set to any value between 0.1 seconds (100 milliseconds) and 300 seconds. For example, timer values of 1, 5, 10, 15, or 20 seconds may be used.

Process 600 then moves to block 625, where process 600 waits for the timer to expire. After the timer expires, process 600 moves to block 630, where a portion of a DLP server response is sent or transmitted to the mobile device. In some implementations, the portion of a DLP server response may comprise at least a portion of http(s) response headers 355 as described above with reference to FIG. 4. For example, portions of an http status, an http response general header, such as the date or time, or a portion of response headers, including portions of a content-type tag, server tag, accept-ranges tag, or a last-modified tag may be sent by the DLP server 110 in processing block 630. Portions or all of one or more of the http header fields illustrated in FIG. 4 may also be sent in block 630. Portions or all of one or more of the other http header fields known in the art may also be sent in block 630 In an embodiment, at least a portion of one or more http X-headers may be sent in block 630.

Additionally, the portion of the response sent in processing block 630 may also include non-http(s) response header fields. For example, in implementations that include a data format as illustrated in FIG. 4, one or more portions of the version # field, public id field, charset field, or length field may be sent in block 630. In implementations that utilize other data formats, portions of response data may be sent in block 630.

Process 600 then moves to decision block 635, which determines whether the processing of the response data is completed. For example, the separate thread of execution discussed above may record its completion status in a variable stored in a memory. Decision block 635 may read the data from the variable to determine if the thread has completed processing. If the processing of the response data is not complete, process 600 moves to processing block 620 where a timer is set with a duration less than the mobile device timeout value, and the process 600 repeats.

If the processing of response data is complete at decision block 635, then process 600 moves to block 640, where the DLP server response to the mobile device is completed by sending a remaining portion of the DLP server response to the mobile device based on the processed email server response data. The remaining portion of the DLP server response may be a complete DLP server response minus any portions of the DLP server response sent in block 630. After the DLP server response has been sent to the mobile device, process 600 moves to an end state 650.

Figure 7:
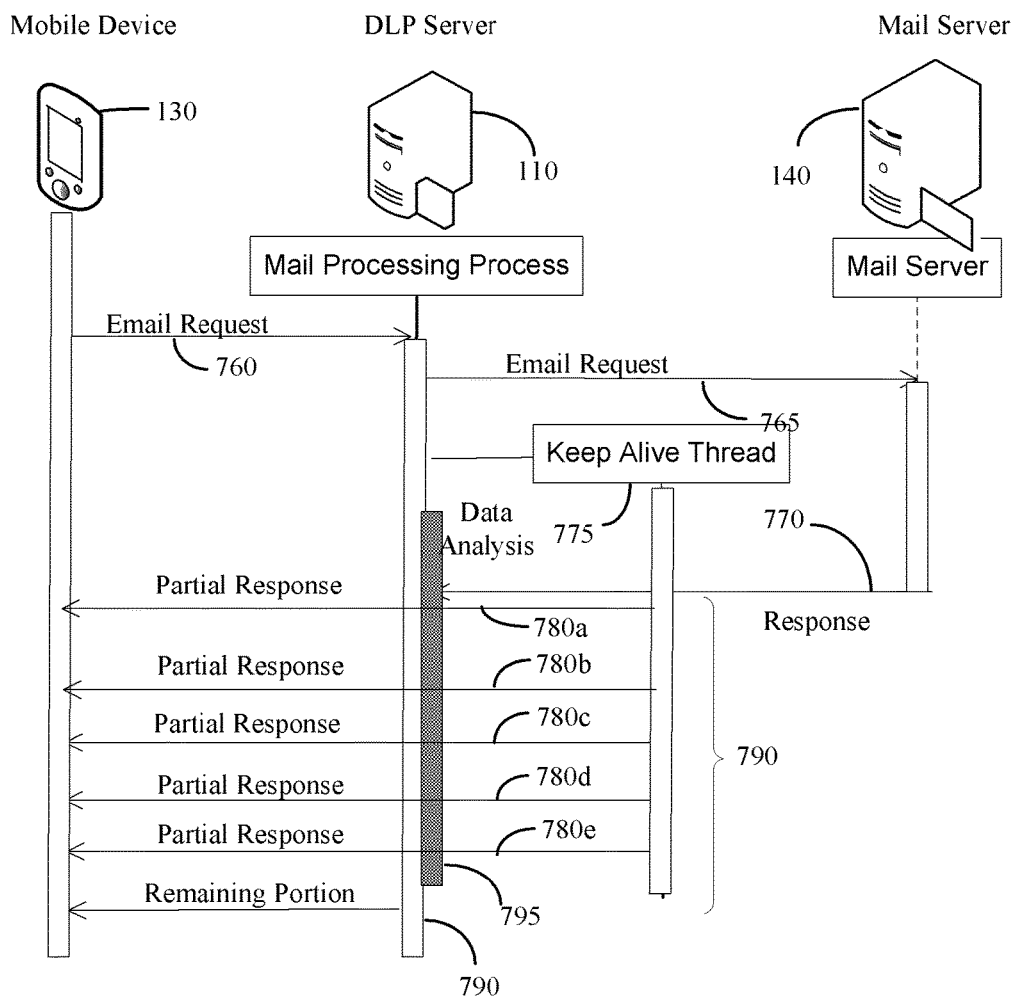
FIG. 7 is a sequence diagram illustrating one embodiment's timing of messages sent between a mobile device, a DLP server that includes multiple threads of execution, and a mail server.

FIG. 7 is a sequence diagram illustrating one embodiment of the timing of messages sent between a mobile device 130, a DLP server 110 that includes multiple threads of execution, and an email server 140. The sequence diagram begins with the mobile device 130 sending a request 760 to its configured server for email, email server 140. In the illustrated example, the DLP server 110 is configured as the mobile device's email server, so the request 760 is sent to the DLP server 110. In some implementations, the request may be an http(s) get request. The email request 760 is received by the DLP server 110. After receiving the request, in the illustrated implementation, the DLP server 110 then creates a keep alive thread 775. The keep alive thread is responsible for maintaining the connection with the mobile device 130 while the analysis necessary to respond to request 760 is performed.

Note that in the illustrated implementation, the keep alive thread 775 is launched before the reply from the email server 140 has been received by the DLP server 110. Other implementations may launch the keep alive thread 775 after the email server 140 has responded to the email request 765.

At some point later in time, the email server 140 responds to the email request 765 with response 770. Response 770 contains an email data set. During the time period 790, the DLP server 110 processes the email data set provided by email server 140. For example, the DLP server 110 may evaluate each email message included in the email data set against one or more DLP policies. This evaluation may be performed by instructions in the data processing module 250 and/or policy module 260 of FIG. 2.

If the one or more policies indicates an individual email or its attachments can be transferred to the mobile device 130, then the DLP server 110 may include that email message in a filtered data set that will be provided to the mobile device 130. If the DLP policies indicate an email message or its attachments should not be transferred to the mobile device, then the DLP server 110 may not include that email in the filtered data set. The described processing will occur during time 790. In some implementations, time 790 exceeds a timeout value used by the mobile device 130 to control its connection to DLP server 110, for example, a mobile device timeout value. If time 790 exceeds the mobile device's timeout value, and no response is received, mobile device 130 may disconnect or otherwise reset the connection with the DLP server 110, preventing the synchronization of email between the mobile device and the DLP server. To prevent this condition from occurring, keep alive thread 775 periodically sends a partial response to the mobile device 130 during time 790. These partial responses are shown in FIG. 7 as partial responses 780a-e.

Upon receiving these partial responses, mobile device 130 may restart a timer that determines whether the mobile device should close its connection with the DLP server 110 or otherwise "give up" on receiving a response to its email request 760. Therefore, these partial responses may enable the email request 760 to remain uncompleted for longer than it would if no responses were received until the DLP server 110 completed its data analysis 795. After the data analysis thread completes, a remaining portion of the response to request 760 is sent to the mobile device 130, completing the email request 760 for email data with the DLP server 110.

Note that although FIG. 7 illustrates use of a keep alive thread 775 to generate partial response messages 780a-e, this is just an example implementation. Other implementations may not use threads as illustrated in FIG. 7, if at all. For example, one other implementation may utilize event driven signals to provide the partial response functions illustrated in FIG. 7.

Figure 8:
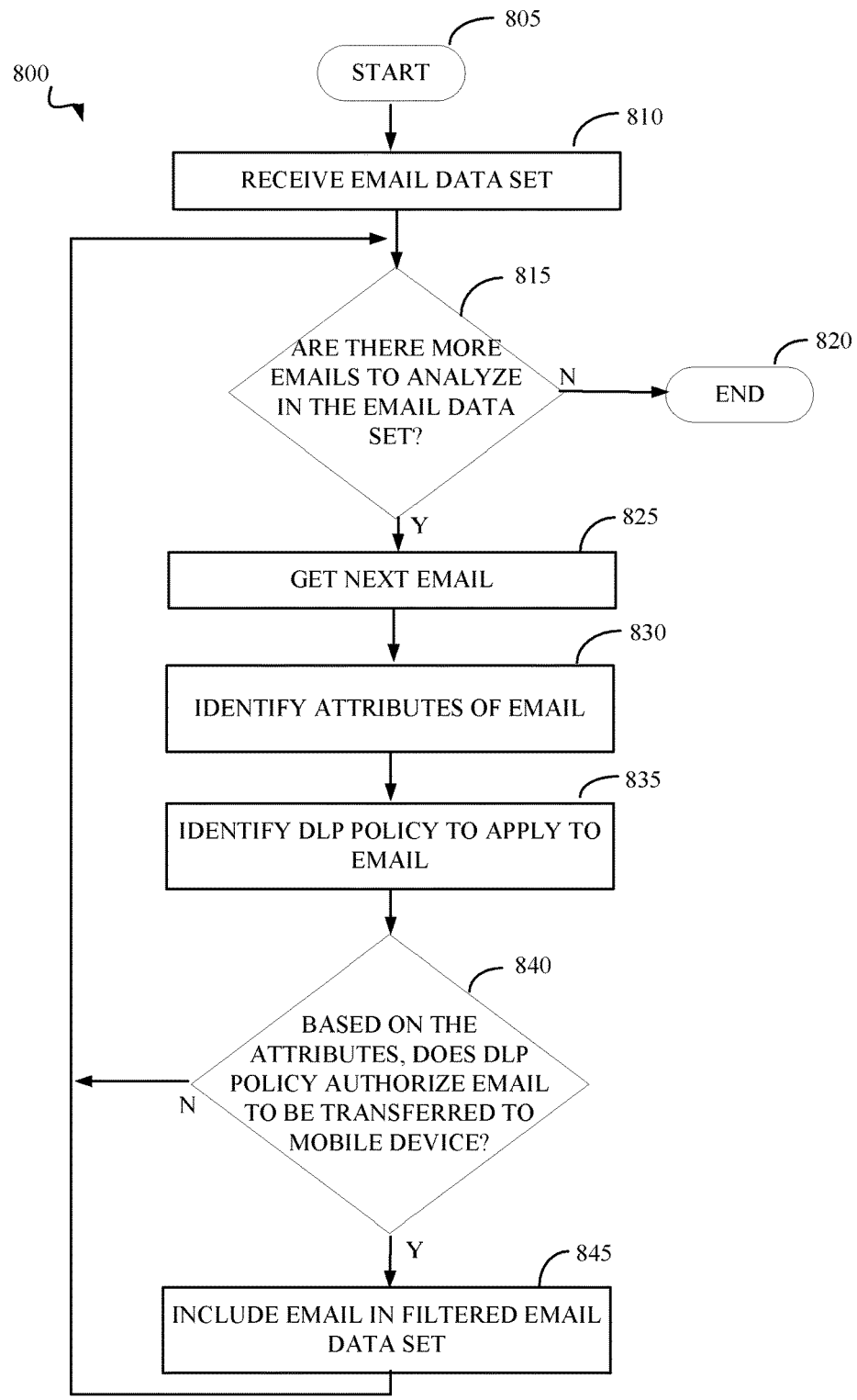
FIG. 8 is a flowchart illustrating an embodiment of a process for processing email response data.

FIG. 8 is a flowchart illustrating an embodiment of a process for processing email response data. Process 800 begins at start block 805 and then moves to processing block 810 where an email data set is received. To perform its data loss protection (DLP) function, a DLP server may process response data from an email server to determine which portions of the response data are authorized for transmission to the mobile device sending the data request in processing block 810. Process 800 then moves to decision block 815, where it is determined whether there are more emails to analyze in the email data set. For example, a DLP server 110 implementing process 800 may parse the response data to identify one or more email messages in the response data. If there are no emails to analyze, process 800 moves to end block 820, where process 800 terminates. If there are more emails to analyze, process 800 moves to processing block 825, where the next email is retrieved from the email data set. Process 800 then moves to processing block 830, where attributes of the email are identified. For example, a DLP server performing process 800 may identify attributes such as the sender of the email, any keywords found in the email or the attachments to the email, the distribution list of the email, whether any attachments of the email are marked as sensitive or confidential or protected with a digital rights management process.

Process 800 then moves to processing block 835, where the DLP server may then identify a DLP policy to apply to the email. The DLP policy may be identified based on one of the attributes identified in processing block 830. Process 800 then moves to decision block 840, where it is determined based on the attributes whether the DLP policy identified in block 835 authorizes the email message to be transferred to a mobile device. In decision block 840, the sensitivity of the email message and any of its attachments may be evaluated based on the DLP policy to determine whether the email is authorized for transmission to the mobile device. If the DLP policy does not authorize the email to be transferred to the mobile device, the process 800 returns to decision block 815. In some embodiments, the fact that an email was not authorized for transfer to the device may be logged. In an embodiment, an incident or ticket may be automatically created in an issue tracking system. In another embodiment, a record of the email not being authorized may be stored in a database. A management user interface may provide access to the database, allowing an administrator to manage unauthorized emails. For example, the user interface may enable the administrator to release the unauthorized email to the mobile device.

If the email is authorized for transfer to the mobile device by the DLP policy, process 800 moves from decision block 840 to processing block 845, where the email is included in a filtered email data set. Process 800 then returns to decision block 815 and proceeds as described above.

Figure 9:
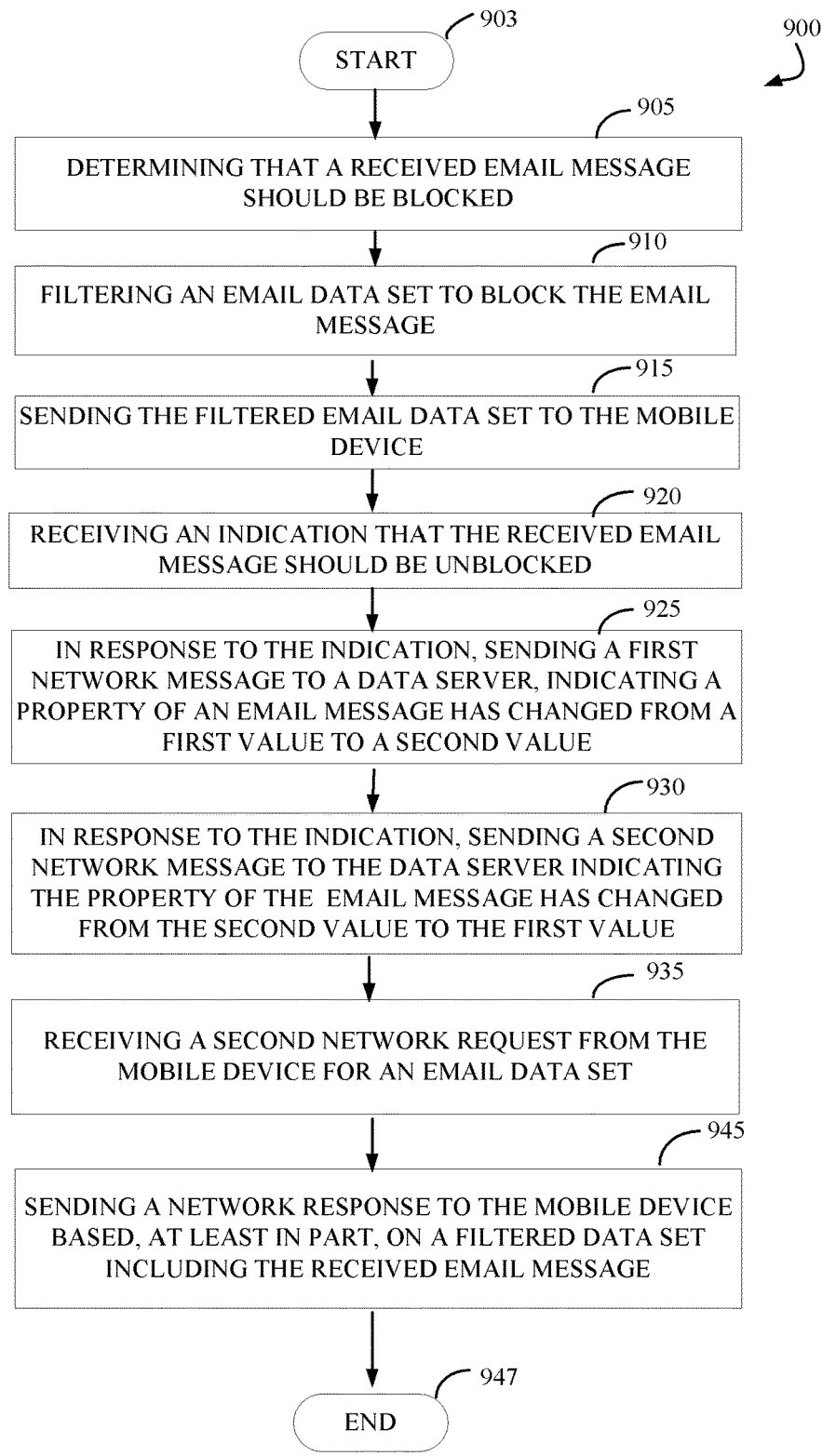
FIG. 9 is a flowchart illustrating an embodiment of a process for managing the transfer of sensitive data to a mobile device.

FIG. 9 is a flowchart illustrating an embodiment of a process for managing the transfer of sensitive data to a mobile device 130. Process 900 may be implemented by instructions included in memory 230 of FIG. 2. Process 900 may be performed as part of the processing of response data initiated in processing block 615, illustrated in FIG. 6. Process 900 begins at start block 903 and then moves to processing block 905, where a determination is made that a received email message should be blocked. In some implementations, a blocked email is not transferred to a mobile device 130. Process 900 then moves to processing block 910, where an email data set is filtered so as to block the email message. In some implementations, a block notification email message may be substituted in the email data for the original blocked email. The block notification message may indicate to a reader that the block notification email is a substitute for the original received email, which DLP policies indicated should be blocked, or not sent to the mobile device 130. In some implementations, the block notification email message may also include an override URL that facilitates access by the reader to a DLP configuration interface.

The configuration interface may allow the user or reader of the block email to "self-release" or override DLP policies that caused the received email to be blocked, and instead indicate that the received email is authorized to be transferred to the mobile device 130. Whether the block email message includes an override URL may be based on the categorization of the email or an attachment to the email. For example, if the email or attachment sensitivity is categorized by the DLP server at a level below a first threshold, the override URL may be included in the block notification message. In some implementations, if the email or attachment sensitivity is categorized by the DLP server at a level above the first or a second threshold, the override URL may not be included in the block notification email message.

In another embodiment, a blocked email is removed from the email data set. In some embodiments, no email replaces or substitutes for the blocked email in the email data set. In some other embodiments, a separate notification email may be sent to a user of the email data set, indicating that a blocked email was removed from the email data set.

In some implementations, the block notification email may include an administrative URL. The administrative URL may identify a web page maintained by the DLP server that provides for administrative functions. By accessing the administrative URL, an administrator may allow the blocked email reader to request that an administrator unblock or authorize the original received email message to be transferred to the mobile device. Whether this URL is present in the block notification email message may be based on whether the sensitivity of the original email message is categorized above a first or second threshold. For example, in an embodiment, if the sensitivity of the original email message is below a threshold, an administrative URL may be included in the block notification email message. In an embodiment, if the sensitivity of the original email message is above a threshold, an administrative URL may not be included in the block notification email message.

After all of the email data in the email data set received from the email server has been analyzed, a filtered email data set is provided. The filtered email data set includes emails authorized for transfer to the mobile device. In an embodiment, the filtered email data set may also include one or more block email messages. These block email messages may have been substituted for received email messages that are not authorized to be transferred to the mobile device. Alternatively, the block emails may be sent independently to the user's inbox, and the blocked emails are removed from the email data set. After processing is complete and the filtered email data set has been created, the process 900 moves to processing block 915, where the filtered email data set is sent to the mobile device.

In processing block 920, a notification is received that the received email message should be unblocked. Recall that the received email message was originally determined to be blocked in processing block 905. This notification may be generated by many entities. For example, a user of a mobile device may click on an override URL included in a block email message to generate the notification. Alternatively, an administrator may utilize an administrative interface provided by the DLP server to generate the notification.

This notification may be the result of the user clicking on the override URL as discussed above. Alternatively, an administrator may have used an administrative interface provided by the DLP server 110 to indicate that the received email should be unblocked, and authorization to transfer the received email to the mobile device is granted. After the indication is received, process 900 moves to block 925, where a sequence is initiated that allows the blocked message to be resynchronized with the mobile device. In the illustrated embodiment, a first network message is sent to a data server. The first network message indicates that a property of an email message had changed from a first value to a second value. In an embodiment, the data server may be an email server, such as a Microsoft Exchange Server or IMAP server. In block 930, a second network message is sent to the data server, indicating the property of the email message has changed from the second value to the first value. In an embodiment, the property may be a folder location of the received email message. For example, in an embodiment communicating with a data server that is a Microsoft Exchange data server, changing the folder location of an email message from one folder to another folder may cause the Exchange server to generate a new identifier for the email message. When the mobile device resynchronizes, this new identifier may be part of the resynchronization, enabling the mobile device to receive the previously blocked email.

In another embodiment, block 930 may not be performed. For example, a single message may be sent that indicates a change in a property of a message. In this embodiment, the single message may cause the Exchange server to generate a new identifier for the email message. As above, when the mobile device resynchronizes, the new identifier may be part of the resynchronization, enabling the mobile device to receive a previously blocked email.

The process 900 then moves to processing block 935, where a second network request is received from the mobile device. The second network request may request an email data set that includes an identifier of the email message of blocks 925 and 930. For example, upon notification of a new message identifier for the unblocked message, the mobile device may perform a resynchronization to retrieve the message corresponding to the new identifier. The resynchronization may be initiated via the second network request of processing block 935 in some implementations. After receiving the second network request from the mobile device, process 900 moves to processing block 945, where a network response is sent to the mobile device. The network response is based, at least in part, on a filtered data set including the received email message. For example, the response may include a filtered data set that includes the original email message and may not include the block notification email message. After the response has been sent, process 900 moves to end block 947.

Figure 10:
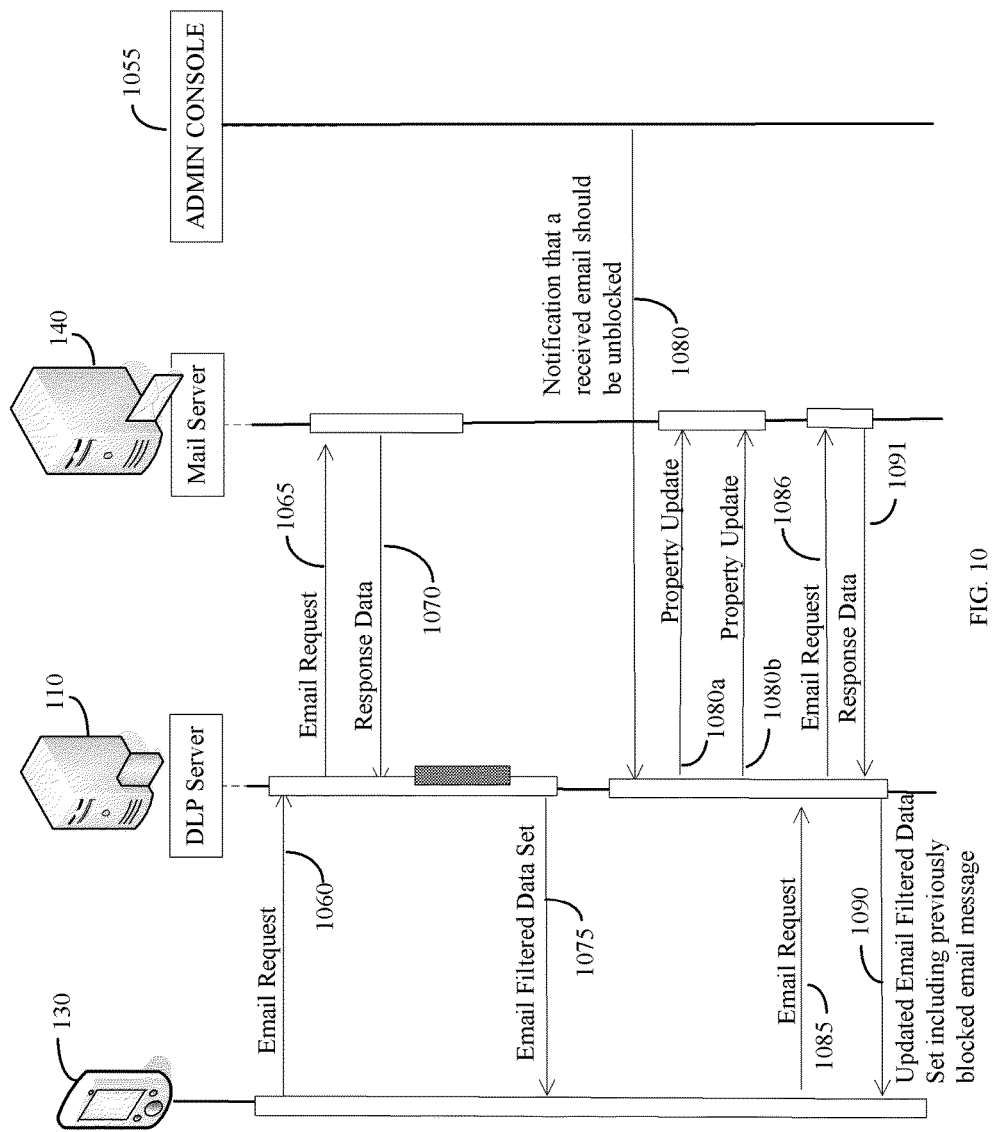
FIG. 10 is a sequence diagram illustrating one embodiment of messages sent between a mobile client, a DLP server, a mail server, and an administrative console.

FIG. 10 is a sequence diagram of messages sent between a mobile client 130, a DLP server 110, a mail server 140, and an administrative console 1055. The sequence diagram begins with the mobile device 130 sending an email data request 560 to the DLP server 110. In response, the DLP server 110 sends an email request 1065 to the email server 140. The DLP server's request to the email server 140 may include account information for the user of mobile device 130. This may allow the DLP server 110 to retrieve the user's email data from email server 140. The email server 140 responds to the email request 1065 with response data 1070. Response data 1070 may be of the format described with reference to FIG. 4 in some implementations. After the DLP server 110 processes the response data, it sends a response 1075 including a filtered email data set to the mobile device 130. The filtered data set included in the response 1075 may include one or more emails that were blocked by policies applied by the DLP server 110. For example, the filtered data set may include a first block notification message that replaced a first original email message, that was included in the response data 1070 received from the email server 140. In another embodiment, blocked messages may be removed from the filtered data set. In this embodiment, the DLP server may send a separate email to the user indicating that a message was blocked and/or removed from the email data set.

After the response 1075 is sent to the mobile device 130, the DLP server receives a notification 1080 from the admin console 1055 that an email message included in the filtered data set should be unblocked. In the illustrated implementation, the DLP server 110 provides an administrative console 1055 that allows network administrators to override DLP policies for specific email messages. When the administrator overrides the application of a DLP policy for a specific email, such as the first original email message discussed in this example, the DLP server 110 may receive a notification of the override in some implementations, such as notification 1080. Note that in some implementations, the administrative interface may be a web based interface hosted by the DLP server 110 itself. In this case, the notification message 1080 may be sent between one component of the DLP server 110 to another component of the DLP server 110. In other implementations, the administrative console 555 may be a thick client application, that communicates with the DLP sever 110 via a network protocol.

Upon receiving the notification 1080, the DLP server 110 may determine whether a user is currently accessing the email "inbox" for the message receiving the indication. If no user is currently accessing the email inbox, the DLP server 110 may record an indication that the received email message has been unblocked. In some implementations, when a mobile user connects to the email server and accesses the email "inbox," the mobile device user may not receive any notification that the status of the received email has changed. When the mobile user connects and logs in to the email server, the DLP server may obtain user/device credentials that are used to update the user's inbox to reflect that the message has been unblocked. In some embodiments, the DLP server 110 may also initiate a sequence that will facilitate resynchronization between the mobile device 130 and the DLP server 110 so as to provide the unblocked email message to the mobile device 130.

In the illustrated embodiment, the DLP server 110 sends a property update message 1080*a* to the email server 140. In an embodiment, the property update message 1080*a* may update a property of the email message that was unblocked by message 1080. In an embodiment, property update message 1080*a* may update a property of the email unblocked by message 1080*a* from a first value to a second value. DLP Server 110 may then send another property update message 1080*b* to the email server 140. In an embodiment, message 1080*b* updates a property of the email message from a second value to a first value. In an embodiment, property update message 1080*a*-*b* may cause the email server 140 to generate a new identifier for the email message unblocked by message 1080.

Later, the mobile device may attempt to resynchronize its email using message 1085. Message 1085 may be based, at least in part, on at least the new identifier assigned to the unblocked email message. In response the DLP server may generate an email data request to the email server 140 via message 1086. A response 1091 may be received by the DLP server from the email server 140. Because the DLP server has recorded an indication that the message identified by notification message 1080 is now unblocked, the DLP server passes the message to the mobile device in message 1090.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various subroutines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

We claim:

1. A method of maintaining a network connection with a mobile device while processing data, comprising:
   receiving a request via the network connection with the mobile device for email data;
   determining a network timeout value of the request from the mobile device;
   initiating processing via the electronic hardware processing circuit, to produce the email data in response to receiving the request;
   in parallel with the processing to produce the email data and while the processing of the email data is incomplete:
   determining an interval less than the network timeout value of the request, and
   sending a portion of a response to the request over the network connection to the mobile device at the interval;
   completing the response to the mobile device over the network connection in response to completion of the production of the email data.

2. The method of claim 1, further comprising:
   determining an operating system of the mobile device; and
   determining the network timeout value of the request based on the operating system.

3. The method of claim 1, further comprising:
   limiting the size of the portion of the response to include four or less bytes of data; and
   generating the portion of the response to not include data derived from the email data.

4. The method of claim 1, further comprising:
   sending a network request for an email data set to a server in response to receiving the request from the mobile device; and
   receiving the email data set from the server after the timer has expired.

5. The method of claim 4, further comprising:
   receiving, from the mobile device, one or more properties of the mobile device;
   filtering the received email data set based on the properties of the mobile device; and
   completing the response to the mobile device based on the filtered email data set.

6. The method of claim 5, further comprising filtering the received data set based on at least one of the mobile device model number, mobile device EUN, or mobile device operating system.

7. The method of claim 5, further comprising filtering the received data set based on whether the mobile device is communicating over a secure channel.

8. The method of claim 1, further comprising iteratively determining a additional predetermined time period has elapsed, and sending of a portion of the response, until processing of the data set is complete.

9. The method of claim 8, further comprising generating the portions of the response to not include email message data or attachments from the data set.

10. The method of claim 1, further comprising:
    determining that a received email message is not authorized to be transferred to the mobile device;
    sending a block notification message to the mobile device in response to the determining;
    receiving an indication that the received email message is authorized to be transferred to the mobile device after sending the response to the mobile device;
    in response to the indication, sending a first network message to the mobile device, the first network message indicating a property of the block notification message has changed from a first value to a second value;
    receiving a second request from the mobile device for an email data set after sending the first network message; and
    in response to the second request, sending a response to the mobile device including the received email message instead of the block notification message.

11. An apparatus for maintaining a network connection with a mobile device while processing data, comprising:
    one or more electronic hardware processors;
    an electronic hardware memory, operably connected to the one or more electronic hardware processors, and storing instructions that configure the processor to perform a method of maintaining a network connection with a mobile device while processing data, the method comprising:
    receiving a request via the network connection from the mobile device for email data;
    determining a network timeout value of the request from the mobile device;
    initiating processing to produce the email data in response to receiving the request;
    in parallel with the processing to produce the email data and while the processing of the email data is incomplete:
    determining an interval less than the network timeout value of the request, and
    sending a portion of a response to the request over the network connection at the interval to the mobile device in response to the determination;
    completing the response to the mobile device over the network connection in response to a completion of the production of the email data.

12. The apparatus of claim 11, wherein the memory stores further instructions that configure the one or more processors to perform additional steps comprising:
    determining an operating system of the mobile device; and
    determining the network timeout value of the request based on the operating system.

13. The apparatus of claim 11, wherein the memory stores further instructions that configure the one or more processors to perform additional steps comprising:
    limiting the size of the portion of the response to include four or less bytes of data; and
    generating the portion of the response to not include data derived from the email data.

14. The apparatus of claim 11, wherein the memory stores further instructions that configure the one or more processors to perform additional steps comprising:
    sending a network request for an email data set to a server in response to receiving the request from the mobile device; and
    receiving the email data set from the server after the timer has expired.

15. The apparatus of claim 14, wherein the memory stores further instructions that configure the one or more processors to perform additional steps comprising:
    receiving, from the mobile device, one or more properties of the mobile device;

filtering the received email data set based on the properties of the mobile device; and completing the response to the mobile device based on the filtered email data set.

16. The apparatus of claim 15, wherein the memory stores further instructions that configure the one or more processors to perform additional steps comprising filtering the received email data based on at least one of the mobile device model number, mobile device EUN, or mobile device operating system.

17. The apparatus of claim 15, wherein the memory stores further instructions that configure the one or more processors to perform additional steps comprising filtering the received email data based on whether the mobile device is communicating over a secure channel.

18. The apparatus of claim 11, wherein the memory stores further instructions that configure the one or more processors to perform additional steps comprising iteratively determining an additional predetermined period of time has elapsed, and sending of a portion of the response in response to the determination until processing of the data set is complete.

19. The apparatus of claim 18, wherein the memory stores further instructions that configure the one or more processors to perform additional steps comprising generating the portion of the response to not include email message data or attachments from the data set.

20. A non-transitory computer readable storage medium comprising instructions that when executed cause a processor to perform a method of maintaining a network connection with a mobile device while processing data, the method comprising:

receiving a request via the network connection from the mobile device for email data;

determining a network timeout value of the request from the mobile device;

initiating processing to produce the email data in response to receiving the request;

in parallel with the processing to produce the email data and while the processing of the email data is incomplete:

determining an interval less than the network timeout value of the request, and sending a portion of a response to the mobile device at the interval in response to the determination; and completing the response to the mobile device over the network connection in response to a completion of the production of the email data.

* * * * *